US010884428B2

(12) United States Patent
Levinson et al.

(10) Patent No.: US 10,884,428 B2
(45) Date of Patent: Jan. 5, 2021

(54) MESH DECIMATION TECHNIQUES AND VALIDATION

(71) Applicant: Zoox, Inc., Menlo Park, CA (US)

(72) Inventors: Jesse Sol Levinson, Redwood City, CA (US); Ashutosh Gajanan Rege, San Jose, CA (US); Brice Rebsamen, San Jose, CA (US); Elena Stumm, San Francisco, CA (US); Nitesh Shroff, Millbrae, CA (US); Derek Adams, Santa Clara, CA (US)

(73) Assignee: Zoox, Inc., Foster City, CA (US)

( * ) Notice: Subject to any disclaimer, the term of this patent is extended or adjusted under 35 U.S.C. 154(b) by 233 days.

(21) Appl. No.: 15/913,686

(22) Filed: Mar. 6, 2018

(65) Prior Publication Data

US 2019/0278293 A1    Sep. 12, 2019

(51) Int. Cl.
*G05D 1/02* (2020.01)
*G06T 17/20* (2006.01)

(52) U.S. Cl.
CPC .......... *G05D 1/0274* (2013.01); *G05D 1/024* (2013.01); *G06T 17/20* (2013.01); *G05D 2201/0213* (2013.01)

(58) Field of Classification Search
CPC ................ G05D 1/024; G05D 1/0274; G05D 2201/0213; G06T 17/20
See application file for complete search history.

(56) References Cited

U.S. PATENT DOCUMENTS

| 9,915,947 | B1* | 3/2018 | LaForge | G05D 1/0077 |
| 2004/0130702 | A1 | 7/2004 | Jupp et al. | |
| 2008/0033645 | A1* | 2/2008 | Levinson | G01C 15/00 |
| | | | | 701/469 |
| 2008/0218513 | A1* | 9/2008 | Kaus | G06T 17/20 |
| | | | | 345/423 |
| 2014/0278029 | A1 | 9/2014 | Tonguz et al. | |
| 2015/0369618 | A1 | 12/2015 | Barnard et al. | |
| 2017/0358133 | A1 | 12/2017 | Iverson et al. | |

(Continued)

OTHER PUBLICATIONS

The PCT Search Report and Written Opinion dated May 23, 2019, for PCT Application No. PCT/US2019/019503, 7 pages.

(Continued)

*Primary Examiner* — Anne Marie Antonucci
*Assistant Examiner* — Sahar Motazedi
(74) *Attorney, Agent, or Firm* — Lee & Hayes, P.C.

(57) ABSTRACT

Techniques for decimating portions of a map of an environment are discussed herein. The environment can be represented by a three-dimensional (3D) map including a plurality of polygons and semantic information associated with the polygons. In some cases, decimation operations may be based on semantic information associated with the environment. Differing decimation operations and/or levels may be applied to polygons of different semantic classifications or differing contribution levels. Boundaries between regions having different semantic information can be preserved. Meshes can be decimated using different decimation operators or decimation levels and an accuracy of localizing can be compared using the various decimated meshes. An optimal mesh can be selected and sent to vehicles for localizing the vehicles in the environment.

20 Claims, 11 Drawing Sheets

(56) References Cited

U.S. PATENT DOCUMENTS

| | | | |
|---|---|---|---|
| 2018/0025099 A1* | 1/2018 | van Gorp | G06F 30/00 |
| | | | 356/138 |
| 2018/0089899 A1 | 3/2018 | Piemonte et al. | |
| 2018/0113474 A1 | 4/2018 | Koda et al. | |
| 2018/0188039 A1* | 7/2018 | Chen | G01C 21/3602 |
| 2018/0188045 A1* | 7/2018 | Wheeler | H04L 67/12 |
| 2019/0080512 A1* | 3/2019 | Johansson | G06T 9/001 |
| 2019/0377358 A1 | 12/2019 | Zapolsky | |
| 2020/0249324 A1 | 8/2020 | Steinberg et al. | |

OTHER PUBLICATIONS

Non Final Office Action dated Oct. 15, 2020 for U.S. Appl. No. 15/913,647, "Mesh Decimation Based on Semantic Information", Levinson, 14 pages.

\* cited by examiner

MESH DECIMATION TECHNIQUES AND VALIDATION

BACKGROUND

Data can be captured in an environment and represented as a map of the environment. Often, such maps can be used by vehicles navigating within the environment, although the maps can be used for a variety of purposes. In some cases, an environment can be represented as a two-dimensional map, while in other cases, the environment can be represented as a three-dimensional map. Further, surfaces within an environment can be represented using a plurality of polygons, among many available methods.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
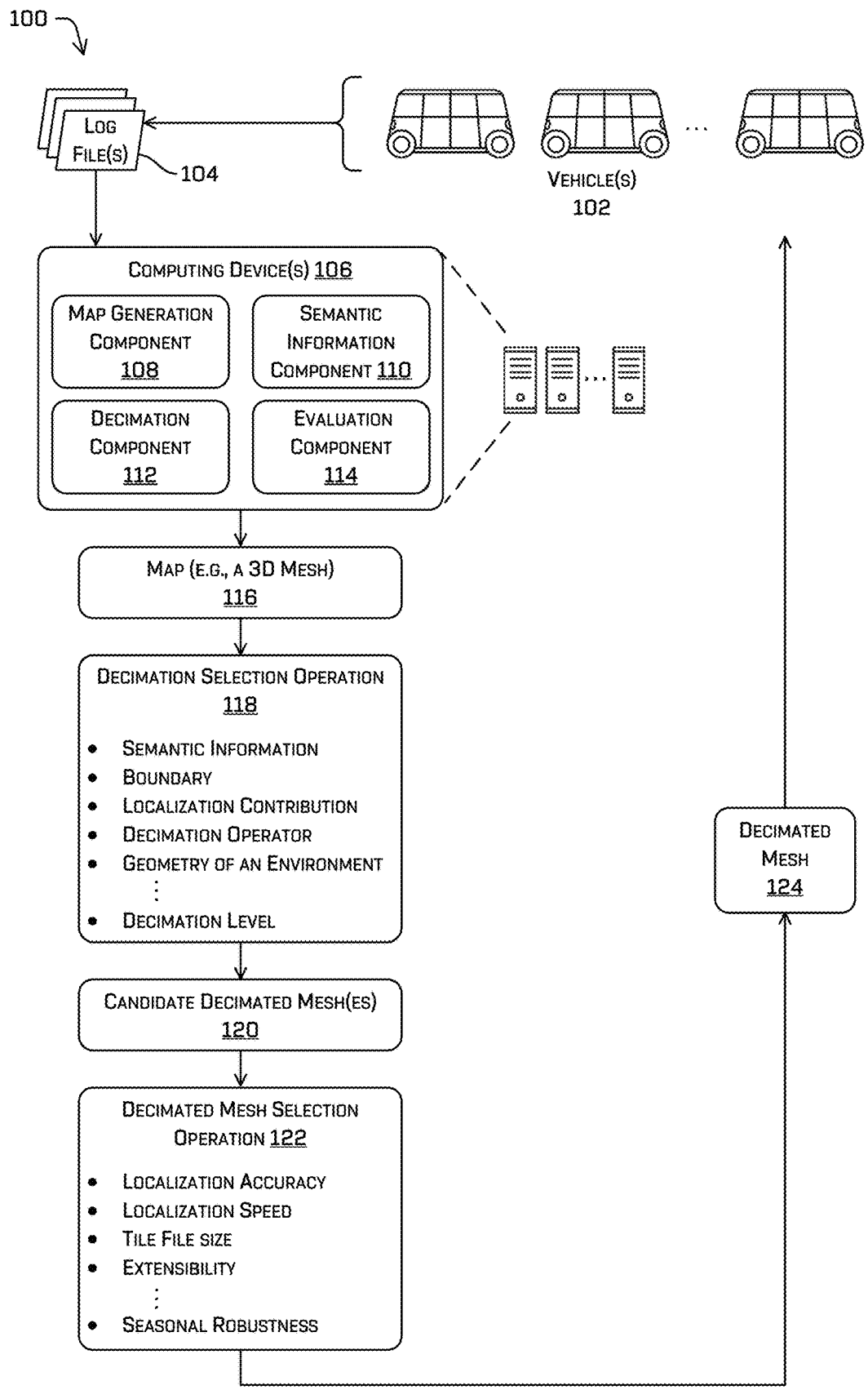
FIG. 1 is a pictorial flow diagram of an example process for capturing data of an environment, generating a map of the environment, selecting a decimation operation for decimating a mesh, selecting a decimated mesh, and sending the decimated mesh to vehicles to navigate within the environment, in accordance with embodiments of the disclosure.

This disclosure is directed to techniques for decimating a map of an environment, including decimation techniques based on semantic information associated with the environment (e.g., information about objects or regions in the environment, such as classes, types, etc., also referred to generally as classification information). Such techniques may reduce memory requirements and computation resources required, while preserving accuracy and utility of the map. In some instances, the environment can be represented by a three-dimensional (3D) map including a plurality of polygons, whereby classification information can be associated with individual polygons of the plurality of polygons. In some instances, the classification information can identify each polygon with a semantic classification, such as "road," "sidewalk," "building," "tree," etc. In one example of a decimation operation, a semantic classification of a first polygon can be compared to a semantic classification of a second, adjacent polygon. If the semantic classifications are the same and a decimation operation across the polygons is determined, the polygons can be combined to form a third polygon. If the semantic classifications are not the same, a boundary between the polygons can be maintained by not combining the polygons, despite a determination to otherwise perform a decimation operation. In some examples, objects directed to a first semantic classification (e.g., a wall) can be decimated using a first decimation operator or a first decimation level, while objects directed to a second semantic classification (e.g., foliage of a tree) can be decimated using a second decimation operator or a second decimation level, thereby preserving different levels of detail for different semantic classifications.

Additional decimation techniques are discussed herein. By way of example, vehicles traversing an environment can utilize an existing map (e.g., a 3D map) to determine a location of a vehicle in the environment. During localization operations, vehicles often use one or more LIDAR sensors (and/or other sensors, such as depth cameras, RADAR, etc.) to capture a point cloud of data representing objects proximate to a vehicle, and can project the point cloud onto the 3D map to determine where portions of the point cloud line up with the 3D map. In some examples, localization operations may be performed via a CLAMS (calibration, localization, and mapping, simultaneously) algorithm, a SLAM (simultaneous localization and mapping) algorithm, and the like. In some instances, individual polygons of the 3D map may positively contribute to localizing a vehicle in the environment. For example, polygons representing a wall or corner of a building may be more helpful to localize a vehicle, while polygons representing foliage of a tree may be relatively less helpful to the localization operations. As a plurality of log files are captured and reviewed over time, individual contributions of polygons to localizing the vehicles can be determined. Accordingly, when generating a decimated mesh from a 3D map, regions including polygons that contribute to localization can be decimated using a first decimation operator or decimated to a first decimation level, while regions including polygons that do not contribute (or contribute less) can be decimated using a second decimation operator or decimated to a second decimation level. Thus, regions including polygons helpful to localization can be preserved, while regions including less helpful polygons can be decimated to reduce a size of the mesh. In some examples, helpful regions can be decimated more or less than regions that are not as helpful to localization operations.

In another example, a mesh of a 3D map can be decimated using a variety of techniques to generate a plurality of candidate decimated meshes. The candidate decimated meshes can be used to localize a vehicle to each candidate decimated mesh, and an accuracy of the localization can be compared to empirically optimize the decimation operations. For example, a 3D map of an environment can be generated and sensor data (such as LIDAR data) can be used in conjunction with the 3D map (e.g., via a projection operation, CLAMS, SLAM, etc.) to determine a first pose or location of a vehicle using the 3D map. A first decimated mesh can be generated by decimating the 3D map using a first decimation operator and/or a first decimation level. The sensor data can be used in conjunction with the first decimated mesh, and a second pose, location, and/or accuracy can be determined with the localization performed relative to the first decimated mesh. In some instances, additional decimated meshes can be generated by varying the decimation operator and/or decimation level, and additional poses, locations, and/or accuracies can be determined using the additional candidate decimated meshes. The various poses, locations, and/or accuracies can be compared to determine an optimal decimation technique based on mesh size (e.g., data size, accuracy of localization, processing time, etc.).

Further, classification information such as semantic information can be used to identify polygons representing different regions or objects of the environment, and operations can include decimating a mesh based on the semantic information. For example, a first subset of polygons associated with a first semantic classification can be identified that is proximate to a second subset of polygons associated with a second semantic classification. A boundary between the first subset and the second subset of polygons can be identified, and the first subset and the second subset of polygons can be decimated independently while substantially maintaining the boundary between the two regions. In some instances, maintaining the boundary can include maintaining a number of vertices and a number of edges along the boundary. Thus, if a first subset of polygons represents a curb, and a second subset of polygons represents a road surface, each subset can be decimated independently to maintain the boundary between the curb and the road surface, for example.

The mesh decimation techniques discussed herein can improve a functioning of a computing device by reducing a size of a 3D map while maintaining an accuracy when using the 3D map for localizing a vehicle in an environment. For example, decimating polygons based on semantic information may allow regions to be more aggressively decimated while maintaining an overall accuracy of localizing a vehicle. In some instances, reducing a size of a 3D map can improve processing, reduce memory requirements, and can maintain an accuracy of localizing a vehicle. As can be understood, maintaining an accuracy while localizing a vehicle can improve safety outcomes when using the vehicle to traverse an environment. Further, reducing a size of a 3D map can reduce network congestion by minimizing an amount of data to be transferred between a computing device and a vehicle, for example, when updating a map as an environment changes over time. These and other improvements to the functioning of the computer are discussed herein.

The methods, apparatuses, and systems described herein can be implemented in a number of ways. Example implementations are provided below with reference to the following figures. Although discussed in the context of an autonomous vehicle, the methods, apparatuses, and systems described herein can be applied to a variety of systems using 3D maps, meshes, or decimation techniques. In another example, the methods, apparatuses, and systems may be utilized in an aviation or nautical context. Additionally, the techniques described herein may be used with real data (e.g., captured using sensor(s)), simulated data (e.g., generated by a simulator), or any combination of the two.

FIG. 1 is a pictorial flow diagram of an example process 100 for capturing data of an environment, selecting a decimation operation for decimating a mesh, selecting a decimated mesh, and sending the decimated mesh to vehicles to navigate within the environment, in accordance with embodiments of the disclosure.

In the example shown, a plurality of vehicles 102 traverse an environment. In some instances, a vehicle of the vehicles 102 can be an autonomous vehicle. As the vehicles 102 traverse the environment, the vehicles 102 can capture sensor data as part of navigating within the environment. As can be understood, the vehicles 102 can utilize a previously-generated map to traverse the environment (e.g., utilizing simultaneous localization and mapping (SLAM) techniques, CLAMS techniques, and the like). The vehicles 102 can generate various log file(s) 104 representing sensor data captured by individual vehicles of the vehicles 102. For example, a log file of the log file(s) 104 can include, but is not limited to, sensor data captured by one or more sensors of the vehicles 102 (e.g., LIDAR sensors, radar sensors, sonar sensors, wheel encoders, inertial measurement units (IMUs) (which may include gyroscopes, magnetometers, accelerometers, etc.), GPS sensors, image sensors, and the like), route information, localization information, and the like. In some cases, the log file(s) 104 can include a log of all sensor data captured by the vehicle(s) 102, decisions made by the vehicle(s) 102, determinations made regarding segmentation and/or classification, and the like.

The log files(s) 104 can be sent to and received by one or more computing device(s) 106. In general, and in some instances, the computing device(s) 106 can include various components to perform various processing and/or operations on the log file(s) 104. For example, the computing device(s) 106 can include a map generation component 108, a semantic information component 110, a decimation component 112, and an evaluation component 114.

In some instances, the map generation component 108 can include functionality to receive the log file(s) 104 and generate a three-dimensional (3D) map based on the data in the log file(s) 104. For example, the map generation component 108 can receive LIDAR data, image sensor data, GPS data, IMU data, radar data, sonar data, etc. and can combine the data to generate a 3D map of the environment. With respect to LIDAR data, the map generation component 108 can receive a plurality of point clouds of data and can combine the data to represent an environment as captured by the vehicle(s) 102. In some instances, the map generation component 108 can generate a mesh based on the sensor data included in the log file(s) 104. Examples of techniques used to generate a mesh of an environment include, but are not limited to, marching cubes, screened Poisson surface reconstruction, Delaunay triangulation, tangent plane estimation, alpha shape algorithm, Cocone algorithm, PowerCrust algorithm, ball pivoting algorithm, surface interpolated methods, and the like. As can be understood, the map generation component 108 can generate a 3D map including a mesh, wherein the mesh includes a plurality of polygons that define the shape of objects in the environment. In some instances, the map generation component 108 can include functionality to divide portions of the mesh into tiles representing a discrete portion of the environment.

In some instances, and as discussed herein, the map generation component 108 can generate a map based on voxels, histograms, point clouds, and is not limited to generating meshes. In some instances, aspects of a map based on voxels, histograms, point clouds, and the like, can be referred to as elements. Further, in some instances, surfaces and objects can be represented as parameterized objects, non-uniform rational basis spline (NURBS), and the like.

The semantic information component 110 can include functionality to receive semantic information and/or to determine semantic information based at least in part on the log file(s) 104, and to associate the semantic information with individual polygons of the mesh of the 3D map. In some instances, the semantic information component 110 can receive the semantic information from the log file(s) 104, whereby the semantic information was determined by individual vehicles of the vehicle(s) 102. In some instances, the semantic information component 110 can perform segmentation and/or classification on the sensor data in the log file(s) 104 (e.g., via one or more segmentation and/or classification algorithms, including, but not limited to machine learning algorithms) to determine the semantic information at the computing device(s) 106. In some instances, the semantic information component 110 can receive first semantic information from the log file(s) 104, can determine second semantic information based on sensor data in the log file(s) 104, and can compare the first semantic information and the second semantic information to verify an accuracy or an agreement of the semantic information. In some cases, receiving semantic information or generating semantic information can be referred to generally as obtaining semantic information. More generally, the operation of obtaining can be said to include receiving, generating, accessing, and/or determining.

Further, in some examples, the semantic information can include a semantic classification of objects represented by polygons in the 3D map. For example, the semantic information can include semantic classifications including, but not limited to, road, curb, sidewalk, grass, tree, tree trunk/branch, foliage (e.g., leaves), building, wall, fire hydrant, mailbox, pole, post, pedestrian, bicyclist, animal (e.g., dog), and the like. In some instances, the semantic information can provide an indication of whether the polygon, object, or element represents a static object, dynamic object, etc. In some instances, the semantic information can include an object identifier to distinguish between different instances of the same semantic classification (e.g., tree #1, tree #2, etc.).

The decimation component 112 can include functionality to decimate (e.g. remove vertices in a mesh) at least a portion of a 3D mesh to generate a decimated mesh. In some instances, the decimation component 112 can receive the 3D mesh generated by the map generation component 108 and the semantic information associated with the 3D mesh by the semantic information component 110, and can apply at least one decimation operation to generate a decimated mesh. In some instances, the decimation component 112 can use a variety of decimation operators to decimate a mesh, including but not limited to, Poisson sampling, Monte Carlo sampling, vertex clustering, vertex decimation, incremental decimation, multiple-choice algorithms, edge collapse, half-edge collapse, quadratic edge collapse, region merging, re-tiling algorithms, and the like. In some instances, the decimation component 112 can select regions (e.g., subsets of polygons or elements) based on semantic information. In some instances, the decimation component 112 can select regions based on a color of object represented by the polygon (e.g., based on image data), distances to other polygons, intensity of sensor data (e.g., intensity of a LIDAR return), surface normal of the polygon, object identifiers, and the like.

In some instances, the decimation component 112 can select a decimation level in connection with applying a decimation operator to a mesh. By way of example and without limitation, a 3D mesh may include 1,000,000 polygons. The decimation component 112 can generate a decimated mesh by selecting a decimation operator (e.g., quadratic edge collapse) and a decimation level (e.g., 70%) such that the decimated mesh generated using the quadratic edge collapse decimation operator includes 700,000 polygons. Of course, this example is merely illustrative, and other decimation operators and decimation levels are contemplated herein.

The evaluation component 114 can include functionality to determine a performance of any decimated mesh generated using the techniques discussed herein. For example, the evaluation component 114 can evaluate an accuracy of localizing a vehicle using a decimated mesh (e.g., against a baseline obtained using GPS data, obtained from other (more accurate) meshes, relative to other locations obtained using other decimated meshes, etc.). In another example, the evaluation component 114 can evaluate a speed of localizing a vehicle (e.g., processing time) using each decimated mesh. In some instances, the evaluation component 114 can evaluate a file size of a decimated mesh. In some instances, the evaluation component 114 can evaluate an extensibility of a decimated mesh to determine an ease in which portions of a decimated mesh can be updated over time. In some instances, the evaluation component 114 can evaluate a seasonal robustness of a decimated mesh (e.g., by comparing an accuracy of localization using a decimated mesh in various seasons, in various weather, and the like). Additional aspects of the evaluation component 114 are discussed throughout the disclosure.

As the computing device(s) 106 receives the log file(s) 104, the computing device(s) 106 can generate a map 116, as discussed herein.

After generating the map 116 (including a 3D mesh), the operations can include a decimation selection operation 118. In some instances, the decimation selection operation 118 can be based on a number of factors, including but not limited to, classification information (e.g., semantic information, distance between objects, geometry, location, time, vehicle occupancy, etc.), semantic information (e.g., associated with regions or individual polygons or elements), boundaries (e.g., to preserve a boundary as to not combine regions of differing semantic categories, also referred to as persisting a boundary), localization contribution (e.g., a measure of a number of times that a polygon is used for localization operations, a measure of a confidence level or uncertainty of fitting sensor data to a polygon, etc.), geometry of an environment (e.g., proximity of polygons, normal vector(s) of polygons, etc.), and the like. Further, the decimation selection operation 118 can be used to select between different decimation operators, between different decimation levels, or any combination of selecting a decimation operator and a decimation level. In response to the decimation selection operation 118, one or more candidate decimated mesh(es) 120 can be generated reflecting the different decimation techniques applied to decimate the map 116.

The operations can further include a decimated mesh selection operation 122. In some instances, the decimated mesh selection operation 122 can include operations performed by the evaluation component 114 to evaluate characteristics of each candidate decimated mesh 120. For example, and without limitation, the decimated mesh selection operation 122 can include evaluating a localization accuracy, a localization speed, tile file size, extensibility, and seasonable robustness.

In response to evaluating and selecting a decimated mesh (e.g., determining an optimal mesh and/or optimizing a decimation operation and/or decimation level), a decimated mesh 124 can be sent to one or more of the vehicles 102 to be utilized by the vehicles 102 for navigating within an environment.

Additional features of the map generation component 108, the semantic information component 110, the decimation component 112, and the evaluation component 114 are discussed in connection with FIG. 6, and throughout this disclosure.

Figure 2:
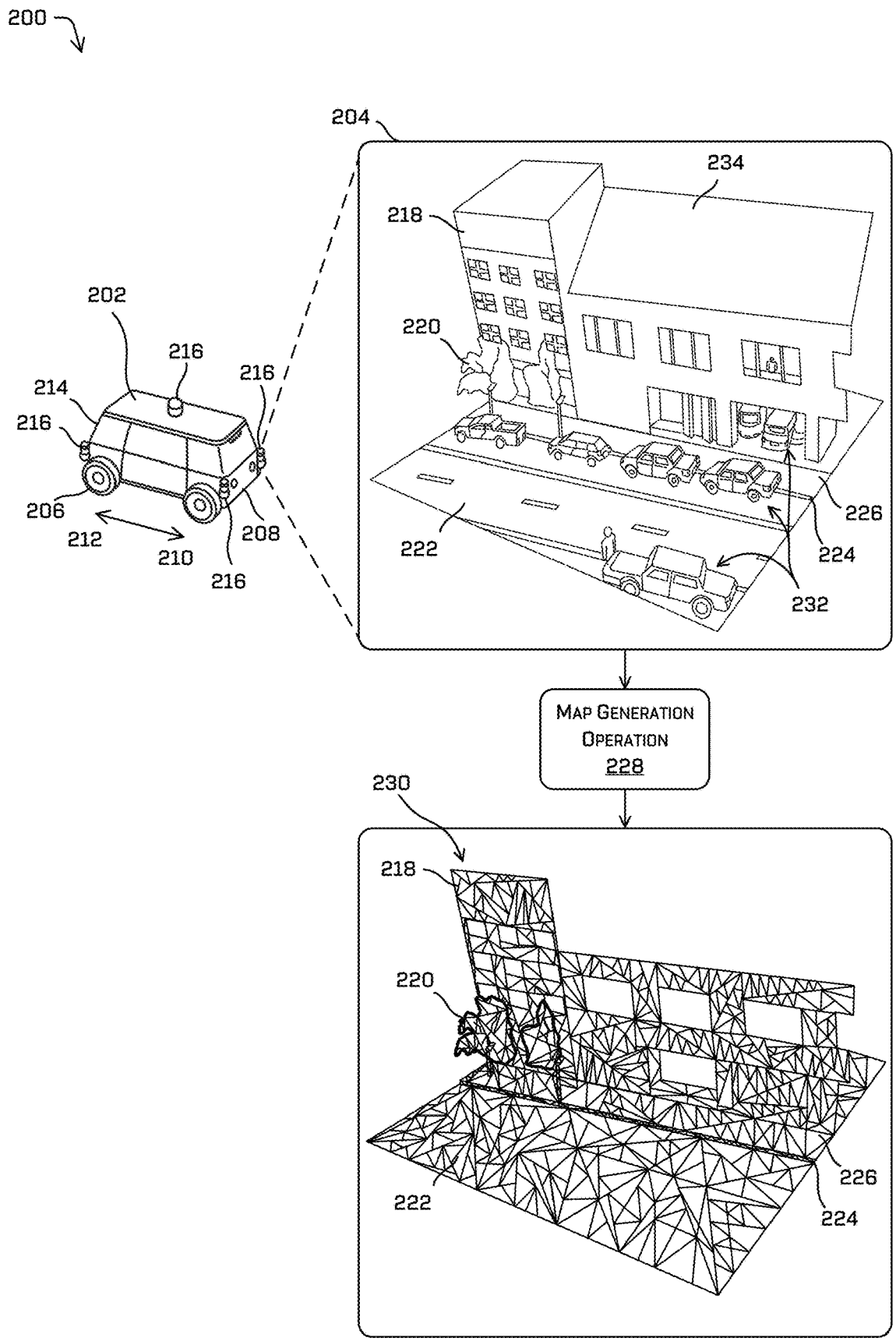
FIG. 2 depicts an example process for capturing data of an environment and generating a map (e.g., a three-dimensional map) of the environment represented as a mesh, in accordance with embodiments of the disclosure.

FIG. 2 depicts an example process 200 for capturing data of an environment and generating a three-dimensional map of the environment represented as a mesh, in accordance with embodiments of the disclosure. In the example shown, an example vehicle 202 travels through an environment 204. For example, the vehicle 202 may be an autonomous vehicle, such as the example vehicle described herein with respect to FIGS. 1 and 6. Although the example vehicle 202 is illustrated as having four wheels 206, the systems and methods described herein may be incorporated into vehicles having fewer or a greater number of wheels, tires, and/or tracks. The example vehicle 202 may have four-wheel steering and may operate generally with substantially equal performance characteristics in all directions, for example, such that a first end 208 of the vehicle 202 is the front end of the vehicle 202 when traveling in a first direction 210, and such that the first end 208 becomes the rear end of the vehicle 202 when traveling in the opposite, second direction 212, as shown in FIG. 2. Similarly, a second end 214 of the vehicle 202 is the front end of the vehicle 202 when traveling in the second direction 212, and such that the second end 214 becomes the rear end of the vehicle 202 when traveling in the opposite, first direction 210. These example characteristics may facilitate greater maneuverability, for example, in small spaces or crowded environments, such as parking lots and urban areas.

A vehicle such as the example vehicle 202 may travel through the environment 204 and collect data for updating a map (e.g., creating a map and/or revising an existing map) and/or for localizing the vehicle 202 within the map. For example, the vehicle 202 may include one or more sensors 216 configured to capture datasets representative of the environment 204 as the vehicle 202 travels through the environment 204. In the example shown in FIG. 2, the sensor(s) 216 and associated description are described in relation to use of one or more LIDAR sensors. Although discussed in the context of LIDAR sensors and/or in the context of an autonomous vehicle, the methods, apparatuses, and systems described herein may be applied to a variety of systems utilizing, for example, machine vision. In addition, although described in relation to three-dimensional LIDAR data, the methods, apparatuses, and systems described herein are not limited to three-dimensional data, and are not limited to LIDAR data. For example, the one or more sensors may be one or more radar sensors, one or more ultrasonic transducers, one or more imagers (e.g., stereoscopic cameras, depth cameras, etc.), and/or any sensor types configured to generate sensor datasets representative of the environment. In some examples, the methods, apparatuses, and systems may be used for other purposes, for example, in a manufacturing assembly line context, or in an aerial surveying context. The datasets may include any number of layers or channels, which may correspond to any number of dimensions. In some examples, the techniques described herein may be used with actual data (e.g., captured using sensor(s)), simulated data (e.g., generated by a simulator), and/or combinations thereof.

The environment 204 illustrates a scene including any number of objects, including but not limited to one or more buildings 218, one or more trees 220 (which may or may not include foliage), one or more road surfaces 222, one or more curbs 224, and one or more sidewalks 226. Of course, any number and type of objects can be represented in the environment 204.

A map generation operation 228 can generate a map of the environment 204 based at least in part on the data captured by the vehicle 202. In some instances, the map generation operation 228 can generate (or update) a mesh 230 representing the environment 204. In some instances, the map generation operation 228 can include associating semantic information with individual polygons of the mesh 230. In some instances, the map generation operation 228 can include removing dynamic objects (such as vehicles 232, pedestrians, bicyclists, and the like). In some instances, the map generation operation 228 can include removing stationary dynamic objects (e.g., parked cars). In some instances, the stationary dynamic objects can be referred to as "potentially dynamic objects." Further, in some instances, the map generation operation 228 can include removing or omitting aspects of objects in the environment, such as a roof 234 of the buildings 218. Of course, the omission of objects in the mesh 230 with respect to the environment 204 may vary, and is not limited to the examples discussed herein. Additional discussion of dynamic objects, stationary dynamic objects and/or potential dynamic objects is provided in U.S. patent application Ser. No. 15/900,319, entitled "Creating Clean Maps Including Semantic Information," the entirety of which is herein incorporated by reference.

In some instances, the map generation operation 228 can generate a first mesh including a first number of polygons. This mesh 230 can be considered to be a baseline mesh or a reference mesh from which other decimated meshes can be compared or evaluated against.

Figure 3:
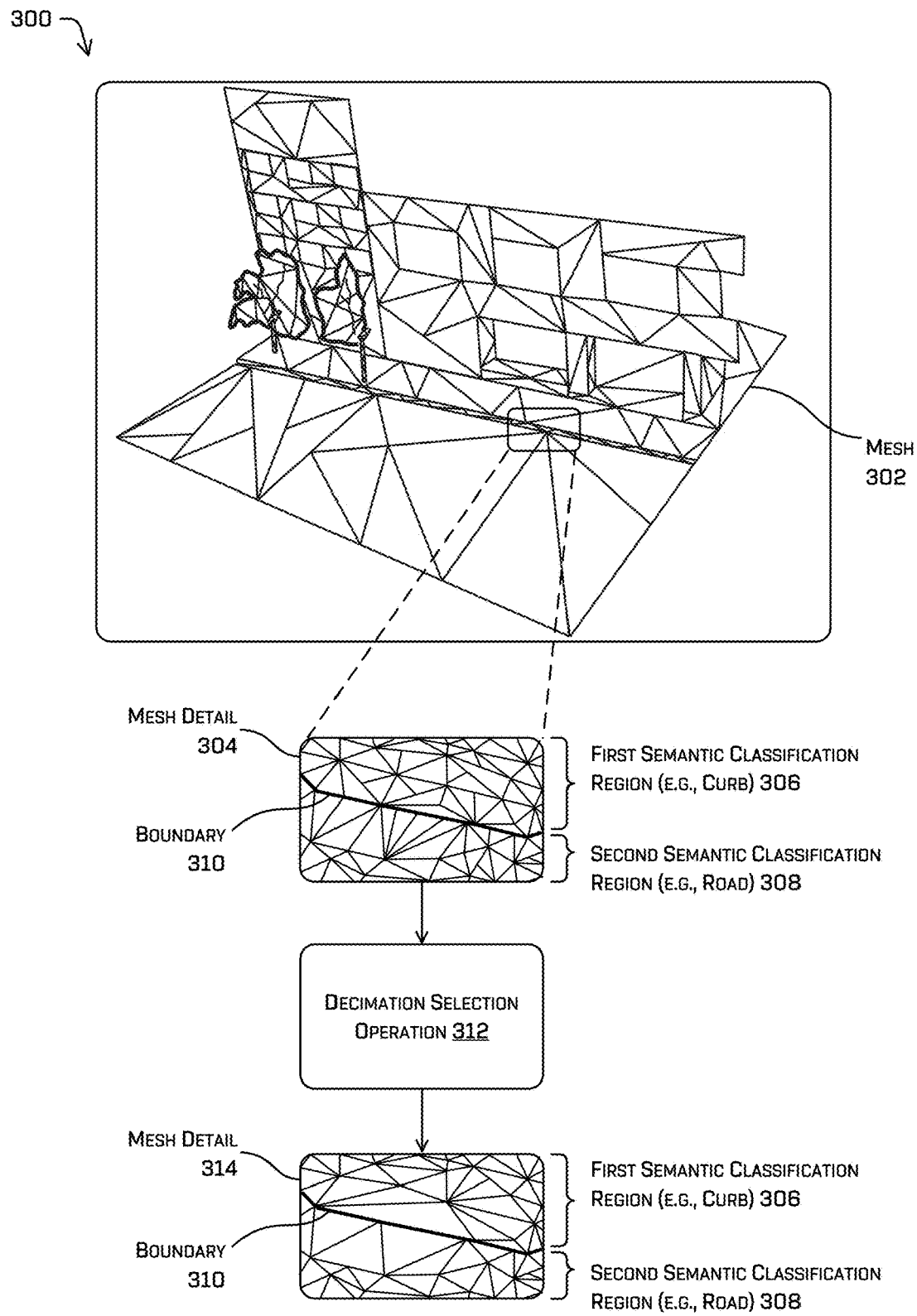
FIG. 3 is a pictorial flow diagram of an example process for decimating a mesh based on classification information (e.g., semantic information), in accordance with embodiments of the disclosure.

FIG. 3 is a pictorial flow diagram of an example process 300 for decimating a mesh based on semantic information, in accordance with embodiments of the disclosure.

A mesh 302 is illustrated in FIG. 3 as an example of a 3D mesh representing an environment. In some instances, the mesh 302 represents a baseline or reference 3D map of the environment generated by the map generation component 108 prior to the mesh decimation operations discussed herein. In general, and as discussed in connection with FIG. 2, the mesh 302 represents an environment including a street, curb, sidewalk, building, and trees. As illustrated in FIG. 3, the mesh 302 does not include dynamic objects such as vehicles, pedestrians, bicyclists, etc., although other examples are contemplated herein. In some instances, a mesh may include objects such as vehicles, pedestrians, bicyclists, etc. represented as a plurality of polygons.

A mesh detail 304 illustrates a close-up of a portion of the mesh 302. The mesh detail 304 illustrates a region 306 associated with a first semantic classification (e.g., a first semantic classification region) and a region 308 associated with a second semantic classification (e.g., a second semantic classification region). As illustrated, the region 306 is associated with a semantic classification of "curb," while the region 308 is associated with a semantic classification of "road." Further, the regions 306 and 308 are separated by a boundary 310.

In some instances, a decimation operator is selected and applied to at least a portion of the mesh 302, illustrated by the decimation selection operation 312. As discussed above, the decimation operation 312 can include, but is not limited to, one or more of vertex clustering, vertex decimation, incremental decimation, multiple-choice algorithms, edge collapse, half-edge collapse, quadratic edge collapse, region merging, re-tiling algorithms, and the like. In some instances, the decimation selection operation 312 is based at least in part on the semantic information associated with the respective regions 306 and 308. For example, the decimation selection operation 312 can include identifying a first polygon in the region 306 and a second polygon in the region 306 and determining that the polygons are associated with a same semantic classification of "curb." Accordingly, based on the semantic information being the same, the decimation selection operation 312 may be applied to the first polygon and the second polygon to combine at least a portion of the first polygon and at least a portion of the second polygon into a third polygon. As may be understood, the decimation selection operation 312 can be performed on the region 306 independently of the decimation selection operation 312 performed with respect to the region 308.

In some instances, the decimation selection operation 312 can be performed so as to substantially maintain the boundary 310 between the first region 306 and the second region 308 (e.g., to persist the boundary 310). As illustrated in the mesh detail 314, the boundary 310 is maintained between the first region 306 and the second region 308. However, with respect to the first region 306, it can be seen that the number, size, and/or location of polygons in the mesh detail 304 differs from the number, size, and or location of polygons in the mesh detail 314. Similarly, with respect to the second region 308, it can be see that the number, size, and/or location of polygons in the mesh detail 304 differs from the number, size, and or location of polygons in the mesh detail 314. In some instances, an arrangement of polygons (e.g., location of vertices) can be changed without changing a number of polygons. In some instances, an arrangement and number of polygons can be modified in the decimation selection operation 312.

In some instances, the boundary 310 can be modified slightly during the decimation selection operation 312 but may be substantially maintained between the two regions 306 and 308. That is, it is not necessary to exactly preserve the boundary 310 between the mesh detail 304 and 314, and slight modifications as to the precise contours of the boundary 310 may be permitted. Of course, in some instances, the boundary 310 may not be modified during any such decimation operations.

In some indicated above, in some instances, a decimation operator can be selected based at least in part on the semantic information associated with a region, a subset of polygons, or with individual polygons. For example, a first decimation operator (e.g., quadratic edge collapse) can be selected for a first semantic classification associated with a first region of polygons, while a second decimation operator (e.g., vertex collapse) can be selected for a second semantic classification associated with a second region of polygons. In some instances, a decimation level can be selected based at least in part on the classification information. For example, a first decimation level (e.g., 70%) can be selected for a first semantic classification associated with a first region of polygons, while a second decimation level (e.g., 50%) can be selected for a second semantic classification associated with a second region of polygons. In some instances, a decimation operator and a decimation level can be selected based at least in part on classification (e.g., semantic) information.

Figure 4:
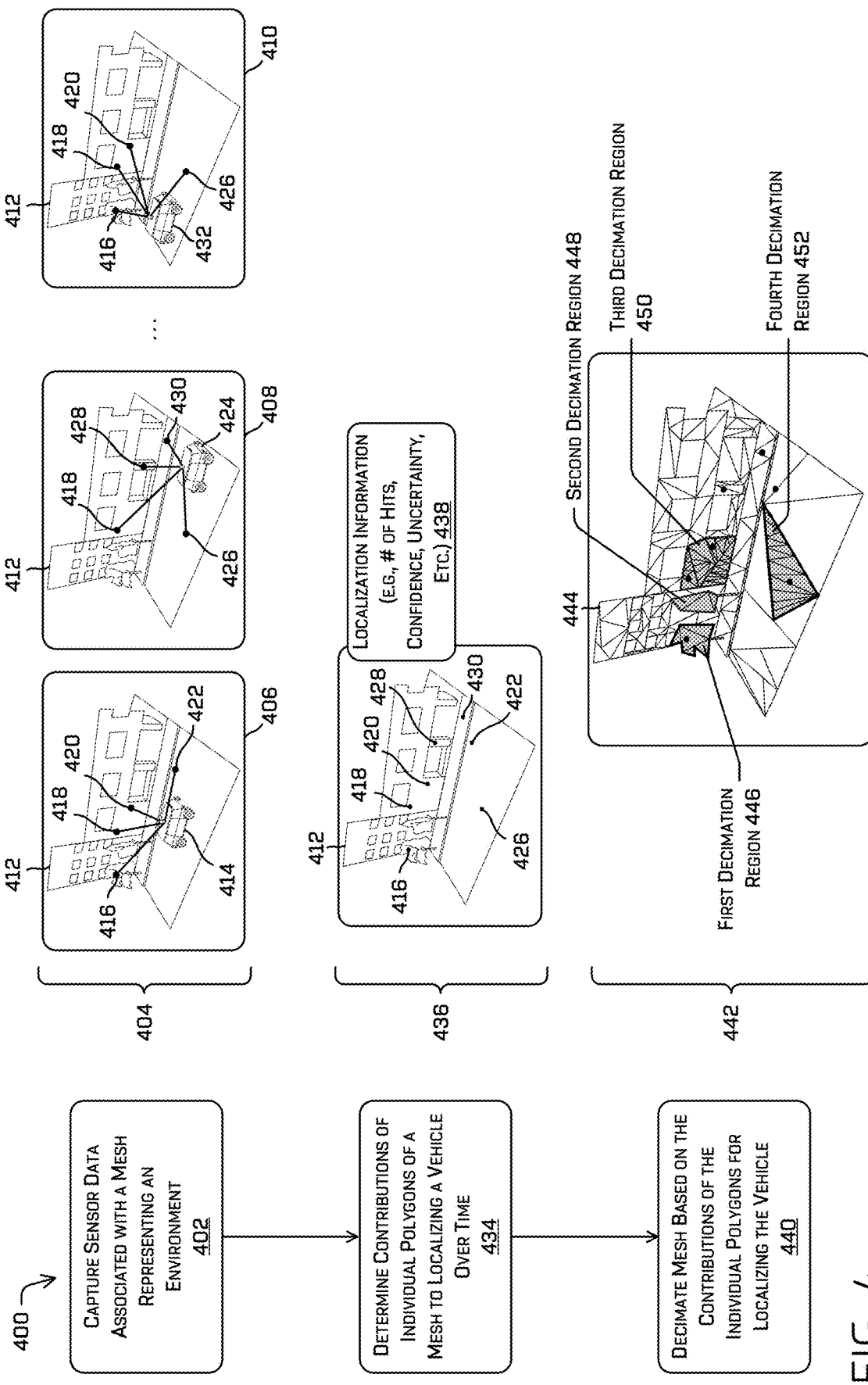
FIG. 4 is a pictorial flow diagram of an example process for capturing data of an environment, determining individual contributions of polygons to localizing a vehicle over time, and decimating a mesh based on the individual contributions of polygons, in accordance with embodiments of the disclosure.

FIG. 4 is a pictorial flow diagram of an example process 400 for capturing data of an environment, determining individual contributions of polygons to localizing a vehicle over time, and decimating a mesh based on the individual contributions of polygons, in accordance with embodiments of the disclosure.

At operation 402, the operation can include capturing sensor data associated with a mesh representing an environment. An example 404 illustrates three instances 406, 408, and 410 of a vehicle capturing data in an environment 412. In the first instance 406, a vehicle 414 (e.g., the vehicle 102 or 202) traverses through the environment 412 (e.g., 204) and captures sensor data during the traversal. As illustrated in the instance 406, the vehicle 414 captures sensor data associated with points 416, 418, 420, and 422 in the environment 412. As can be understood, the vehicle 414 can capture the sensor data associated with the points 416, 418, 420, and 422, and can determine, using the sensor data and a mesh (e.g., the mesh 230), a location and/or orientation (e.g., a pose) of the vehicle 414 in the environment 412. Accordingly, the vehicle 414 can fit the sensor data into corresponding polygons of the mesh 230. That is to say, in some instances, the vehicle 414 represents a vehicle performing localization operations or SLAM operations.

As illustrated in the instance 408, a vehicle 424 traverses through the environment 412 and captures sensor data during the traversal. As illustrated in the instance 408, the vehicle 424 captures sensor data associated with points 418, 426, 428, and 430. As can be understood, the vehicle 424 can capture sensor data associated with any number of points, and the points illustrated in the instance 408 are merely exemplary. As discussed above, the vehicle 424 can capture the sensor data associated with the points 418, 426, 428, and 430, and can determine a location and/or orientation of the vehicle 424 in the environment 412 based on the sensor data and a mesh (e.g., the mesh 230) representing the environment. Accordingly, the vehicle 424 can fit the sensor data into corresponding polygons of the mesh 230.

As illustrated in the instance 410, a vehicle 432 traverses through the environment 412 and captures sensor data during the traversal. As illustrated in the instance 410, the vehicle 432 captures sensor data associated with points 416, 418, 420, and 426. As can be understood, the vehicle 432 can capture sensor data associated with any number of points, and the points illustrated in the instance 410 are merely exemplary.

Of course, while the example 404 illustrates the three instances 406, 408, and 410, any number of instances can be used reflecting a plurality of instances of one or more vehicles traversing through an environment. As can be understood, the operation 402 may include vehicle traversals and positions in a wide range of scenarios. For example, a vehicle may capture sensor data with the vehicle moving right to left in the environment 412, left to right in the environment 412, from a variety of lane positions in a road, etc. Similar to the operations illustrated above in connection with FIG. 1, as data is captured in the instances 406, 408, and 410, the data may be sent to the computing device(s) 106, for example, for additional processing, as discussed herein.

At operation 434, the process can include determining contributions of individual polygons of a mesh to localizing a vehicle over time. An example 436 illustrates the environment 412 as well as the points 416, 418, 420, 422, 426, 428, and 430 captured by the vehicles 414, 424, and 432 in the instances 406, 408, and 410. Although a mesh is not illustrated in the example 436, in some instances, the operation 434 can include associating sensor data collected by individual vehicles over time with individual polygons of a mesh representing the environment 412. For example, the operation 434 can include determining localization information 438 for individual polygons representing a mesh of the environment 412. In some instances, the localization information 438 can include a count associated with a number of times that captured sensor data has been associated with a particular polygon of a mesh. In some instances, the localization information 438 can include a confidence level of associating sensor data with a particular polygon of a mesh (e.g., how confident the system is in associating a point of sensor data with a particular polygon). In some instances, the localization information 438 can include a distribution of the confidence levels with respect to a number of hits, and in some instances, the localization information 438 can include a metric associated with a "helpfulness" of each individual polygon to localizing vehicles in the environment over time. In some instances, the localization information 438 can include an uncertainty associated with a pose generated utilizing a SLAM algorithm, for example.

In some instances, the operation 434 can include determining a pose and uncertainty associated with the pose by localizing a vehicle using a mesh. A particular polygon can be removed from the mesh and localization operations can be performed using the mesh (with one or more polygons omitted) and an updated pose and updated uncertainty can be determined. A contribution of the particular polygon (or plurality of polygons) can be inferred based on the difference in the pose and updated pose, and based on the difference between the uncertainty and the updated uncertainty. These operations can be performed iteratively to determine a contribution of one or more polygons of a mesh.

Additional examples of the localization information 438 are provided below. With respect to the point 416, this point corresponds to a point on foliage of a tree in the environment 412. This point 416 was captured in the instances 406 and 410, and in one example, the contribution of the point 416 to localizing the vehicles 414 and 432, for example, was low. As can be understood, the foliage represented by the point 416 may provide relatively low usefulness for localizing a vehicle because the foliage may not present a consistent surface for localization. The point 416 can be associated with a polygon of a mesh of the environment 412, and localization information 438 can be based on the accumulation of data over time.

With respect to the point 418, this point corresponds to a point on a wall (or a corner or a unique feature) of a building in the environment 412. This point 418 was captured in the instances 406, 408, and 410, and in one example, the contribution of the point 418 to localizing the vehicles 414, 424, and 432, for example, was high. As can be understood, the wall represented by the point 418 may provide relatively high usefulness for localizing a vehicle because the wall (or corner or unique feature) may present a consistently recognizable surface for localization. The point 418 can be associated with a polygon of a mesh of the environment 412, and localization information 438 can be based on the accumulation of data over time.

With respect to the point 420, this point corresponds to another point on a wall of a building in the environment 412. This point 420 was captured in the instances 406 and 410, and in one example, the contribution of the point 420 to localizing the vehicles 414 and 432, for example, was high. As can be understood, the wall represented by the point 420 may provide relatively high usefulness for localizing a vehicle because the wall may present a consistent surface for localization. The point 420 can be associated with a polygon of a mesh of the environment 412, and localization information 438 can be based on the accumulation of data over time.

With respect to the point 422, this point corresponds to a point on a road surface in the environment 412. This point 422 was captured in the instance 406, and in one example, the contribution of the point 422 to localizing the vehicle 414, for example, was high. In one example, the contribution of the point 422 to localizing a vehicle can be based on the strength of a localization signal, confidence level, uncertainty, and/or a number of times a polygon was associated with the point 422. The point 422 can be associated with a polygon of a mesh of the environment 412, and localization information 438 can be based on the accumulation of data over time.

Similarly, the localization information 438 for the polygons associated with the points 426, 428, and 430 can be based on a number of times data captured by a vehicle is associated with a polygon, uncertainty, and/or based on a confidence value associated with mapping individual points of sensor data with an individual polygon. As can be understood, the discussion of the localization information 438 in the example 436 is exemplary, and is not limited to the examples presented herein.

At operation 440, the process can include decimating a mesh based at least in part on contributions of individual polygons for localizing the vehicle. In an example 442, the environment 412 is represented by a mesh 444 illustrating the results of decimating a mesh based on the contributions of the individual polygons for localizing a vehicle. For example, the mesh 444 includes a first decimation region 446, a second decimation region 448, a third decimation region 450, and a fourth decimation region 454. Although not labeled, the example 442 illustrates the points 416, 418, 420, 422, 426, 426, and 430 discussed above.

The first decimation region 446 is illustrated as including the point 416, and corresponds to foliage of a first tree in the environment 412. In one example, the polygons represented in the first decimation region 446 were decimated to reduce the number of polygons to a relatively low level based on the localization information indicating that the contributions of polygons representing the foliage was relatively low. Of course, the opposite may be utilized, such that regions that are relatively less helpful to localization may be decimated less than more helpful regions.

In some instances, the second decimation region 448 represents a region decimated using a similar decimation operator and/or decimation level as used to generate the first decimation region 446. That is, in some instances, the contribution of the polygons in the first decimation region 446 were determined and decimated accordingly. Based on the polygons in the first decimation region 446 and the second decimation region 448 being associated with a same semantic classification (e.g., tree, foliage, etc.) the second decimation region 448 can be generated using a same or similar decimation operation and/or decimation level as used with respect to the first decimation region 446.

The third decimation region 450 is illustrated as including the points 418 and 420, which as discussed above, in at least one example, represent polygons having a relatively high contribution to localizing a vehicle. Accordingly, the third decimation region 450 is illustrated as having a relatively high number of polygons, as the individual polygons were found to be helpful to the localization operations. In some instances, and as illustrated in the example 442, the third decimation region 450 may include more than the particular polygons found to have high contributions to the localization operations. That is, in some instances, for a polygon found to have a relatively high contribution to a localization operation, the operation 440 can preserve or persist polygons within a threshold distance of the particular polygon. Thus, the third decimation region 450 can include a plurality of polygons and may not be limited to polygons having a relatively high contribution to localization.

The fourth decimation region 452 is illustrated as including the point 426. Similar to the third decimation region 450, the fourth decimation region 452 is illustrated has having a relatively high number of polygons based on the localization information. In some instances, the operation 440 of decimation the mesh may be based on individual contributions of polygons to localizing a vehicle and based on the semantic information associated with the various polygons. That is, the fourth decimation region 452 may be decimated differently than the third decimation region 450 based on semantic information, despite polygons from both regions providing relatively high contributions to the localization operations.

Of course, the mesh 444 may be represented by any number of decimation regions, and is not limited to the number, size, type, etc. of decimation regions, and is not limited to the decimation operators and/or decimation levels discussed herein.

Figure 5:
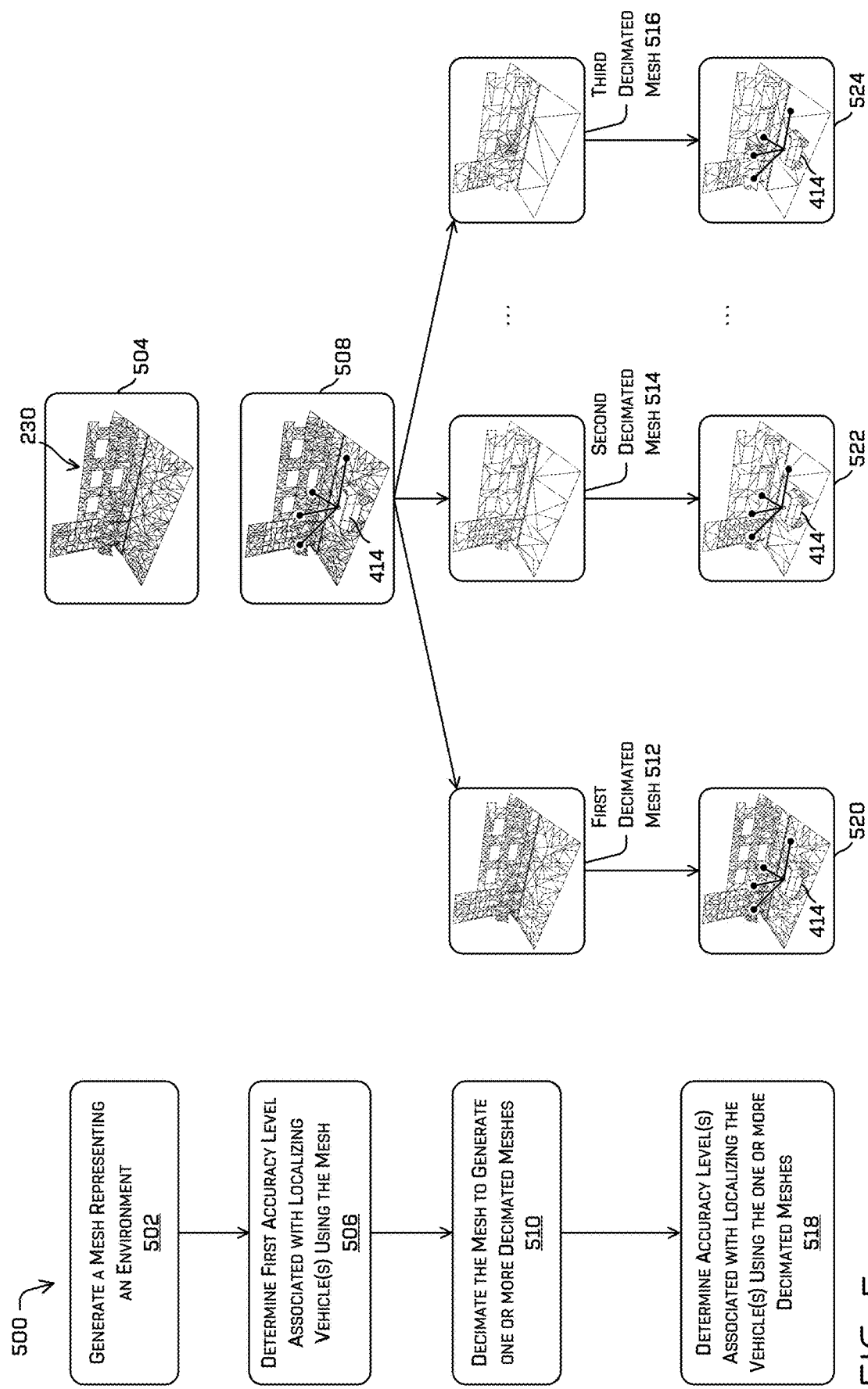
FIG. 5 is a pictorial flow diagram of an example process for generating a mesh (e.g., a three-dimensional mesh), generating one or more decimated meshes, and comparing an accuracy when localizing a vehicle using the various meshes, in accordance with embodiments of the disclosure.

FIG. 5 is a pictorial flow diagram of an example process 500 for generating a three-dimensional mesh, generating one or more decimated meshes, and comparing an accuracy when localizing a vehicle using the various meshes, in accordance with embodiments of the disclosure.

At operation 502, the process can include generating a mesh (e.g., a three-dimensional (3D) mesh) representing an environment. An example 504 illustrates a mesh (e.g., the mesh 230 of FIG. 2). In some instances, the mesh 230 represents baseline or reference mesh from which a highest accuracy of localization can be obtained. In some instances, the mesh 230 may include some level of decimation.

At operation 506, the process can include determining a first accuracy level associated with localizing one or more vehicles using the mesh. In an example 508, a vehicle (e.g., the vehicle 414 of FIG. 4) can traverse through the environment represented by the mesh to capture sensor data representing the environment. In some examples, the captured sensor data can be input to a SLAM algorithm, Kalman filter algorithm, Bayesian probability algorithm, Iterative Closest Point algorithm, etc., for example, to determine a pose and uncertainty of the vehicle. In another example, as discussed herein, the sensor data (e.g., LIDAR data) can be projected onto the mesh (e.g., the mesh 230) to determine where the points of the sensor data line up with polygons of the mesh. Based at least in part on aligning the sensor data with the mesh, a location and/or orientation of the vehicle with respect to the mesh can be determined. In some instances, the sensor data can include GPS data, IMU data, wheel encoder data, etc., which can be used to confirm the location based on aligning the sensor data, and/or can be used as a ground truth from which to evaluate an accuracy of the location based on aligning the sensor data.

In some instances, the operation 506 can include receiving log files from a plurality of vehicles traversing an environment. Each log file can be used to evaluate an accuracy of localizing a vehicle with respect to a particular mesh, and an aggregate accuracy can be determined that is reflective of the plurality of log files.

At operation 510, the process can include decimating the mesh to generate one or more decimated meshes (also referred to as candidate meshes). By way of example, and without limitation, FIG. 5 illustrates a first decimated mesh 512, a second mesh 514 and a third decimated mesh 516, although any number of decimated meshes can be generated.

In some instances, the first decimated mesh 512 can include a first plurality of polygons, the second decimated mesh 514 can include a second plurality of polygons, and the third mesh 516 can include a third plurality of polygons. In some instances, the first plurality of polygons may be greater than the second plurality of polygons, which in turn may be greater than the third plurality of polygons. Further, the first plurality of polygons may be less than a number of polygons associated with the mesh 230 (illustrated in the example 504). That is, the meshes 512, 514, and 516 may represent meshes decimated with various decimation levels and/or decimation operators, resulting in meshes having different number and/or arrangement of polygons.

As may be understood, the operation 510 may generate decimated meshes in accordance with any of the techniques discussed herein. In some instances, the one or more decimated meshes may be generated based at least in part on semantic information, localization information, boundaries, object identifiers, surface normal vectors, data intensity, polygon color, and the like.

At operation 518, the process may include determining one or more accuracy levels associated with localizing the one or more vehicles using the one or more decimated meshes. As illustrated, an example 520 shows the vehicle 414 performing localization operations to determine a location and/or orientation of the vehicle 414 with respect to the first decimated mesh 512. An example 522 shows the vehicle 414 performing localization operations to determine a location and/or orientation of the vehicle 414 with respect to the second decimated mesh 514. An example 524 shows the vehicle 414 performing localization operations to determine a location and/or orientation of the vehicle 414 with respect to the third decimated mesh 516. In some instances, an accuracy can be determined with respect to localizing a vehicle with respect to a particular mesh. Further, the accuracy levels can be determined and compared to evaluate a performance of the individual candidate decimated meshes. In some examples, the uncertainty levels associated with the localization information may be determined. In some examples, an accuracy of the various candidate meshes can be determined with respect to a known location determined by localizing against a higher (or highest) resolution mesh, a location and/or pose determined using a CLAMS system (calibration, localization and mapping, simultaneously), and the like.

Figure 6:
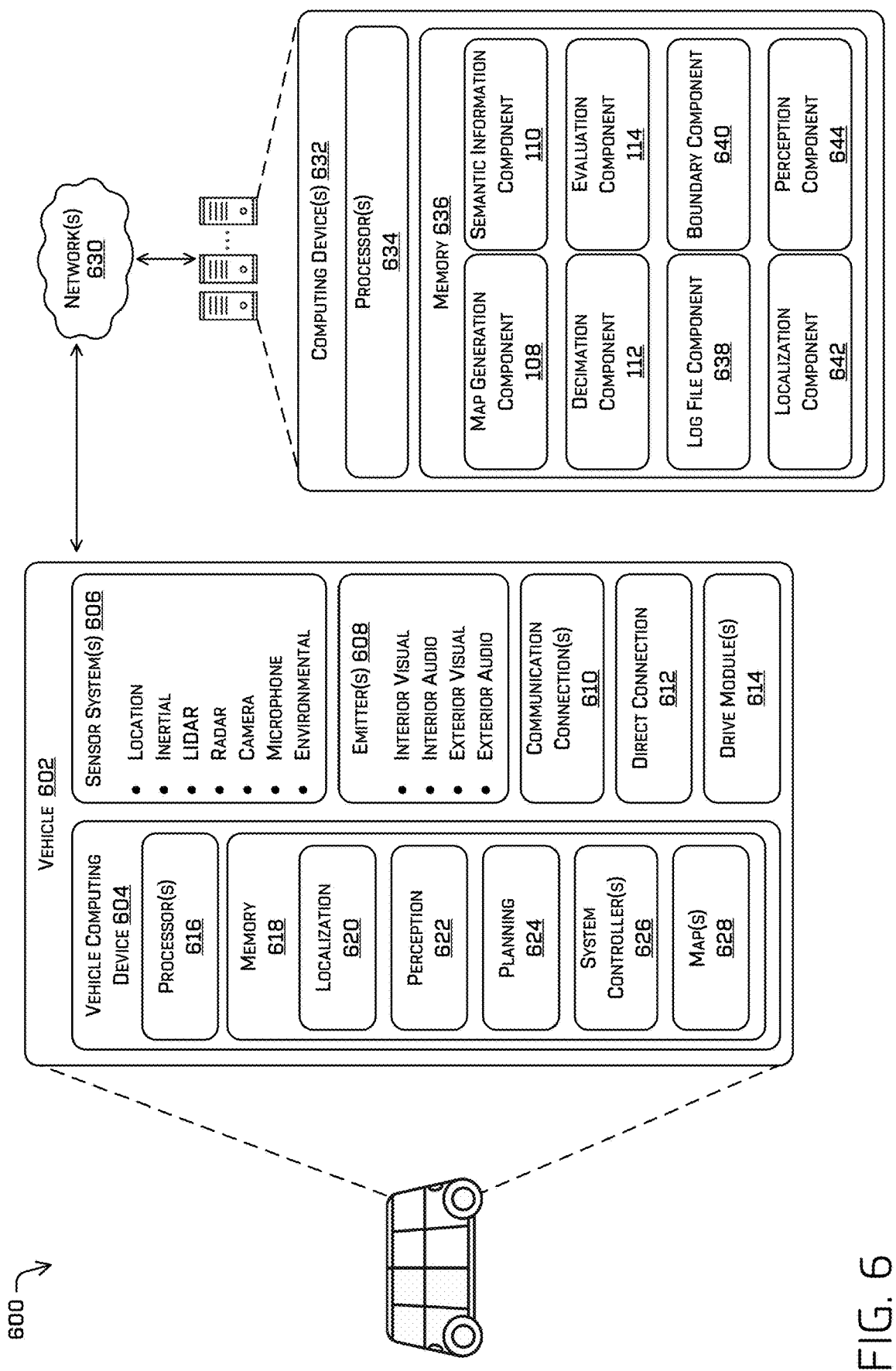
FIG. 6 depicts a block diagram of an example system for implementing the techniques described herein.

FIG. 6 depicts a block diagram of an example system 600 for implementing the techniques described herein. In at least one example, the system 600 can include a vehicle 602, which can be the same vehicle as the vehicles 102, 202, 414, 424, and 432, described above with reference to FIGS. 1, 2, and 4.

The vehicle 602 can include a vehicle computing device 604, one or more sensor systems 606, one or more emitters 608, one or more communication connections 610, at least one direct connection 612, and one or more drive modules 614.

The vehicle computing device 604 can include one or more processors 616 and memory 618 communicatively coupled with the one or more processors 616. In the illustrated example, the vehicle 602 is an autonomous vehicle; however, the vehicle 602 could be any other type of vehicle.

In the illustrated example, the memory 618 of the vehicle computing device 604 stores a localization component 620, a perception component 622, a planning component 624, one or more system controllers 626, and one or more maps 628. Though depicted in FIG. 6 as residing in memory 618 for illustrative purposes, it is contemplated that the localization component 620, the perception component 622, the planning component 624, the one or more system controllers 626, and the one or more maps 628 may additionally, or alternatively, be accessible to the vehicle 602 (e.g., stored remotely).

In at least one example, the localization component 620 can include functionality to receive data from the sensor system(s) 606 to determine a position of the vehicle 602. For example, the localization component 620 can include and/or request/receive a three-dimensional map of an environment and can continuously determine a location of the autonomous vehicle within the map. In some instances, the localization component 620 can utilize SLAM (simultaneous localization and mapping) or CLAMS (calibration, localization and mapping, simultaneously) to receive image data, LIDAR data, radar data, IMU data, GPS data, wheel encoder data, and the like to accurately determine a location of the autonomous vehicle. In some instances, the localization component 620 can provide data to various components of the vehicle 602 to determine an initial position of an autonomous vehicle for generating a candidate trajectory, as discussed herein.

In some instances, the perception component 622 can include functionality to perform object detection, segmentation, and/or classification. In some examples, the perception component 622 can provide processed sensor data that indicates a presence of an entity that is proximate to the vehicle 602 and/or a classification of the entity as an entity type (e.g., car, pedestrian, cyclist, building, tree, road surface, curb, sidewalk, unknown, etc.). In additional and/or alternative examples, the perception component 622 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 624 can determine a path for the vehicle 602 to follow to traverse through an environment. For example, the planning component 624 can determine various routes and trajectories and various levels of detail. For example, the planning component 624 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 624 can generate an instruction for guiding the autonomous vehicle along at least a portion of the route from the first location to the second location. In at least one example, the planning component 624 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (i.e., within technical tolerances) in accordance with a receding horizon technique.

In at least one example, the vehicle computing device 604 can include one or more system controllers 626, which can be configured to control steering, propulsion, braking, safety, emitters, communication, and other systems of the vehicle 602. These system controller(s) 626 can communicate with and/or control corresponding systems of the drive module(s) 614 and/or other components of the vehicle 602.

The memory 618 can further include one or more maps 628 that can be used by the vehicle 602 to navigate within the environment. For the purpose of this discussion, a map can be any number of data structures modeled in two dimensions or three dimensions that are capable of providing information about an environment, such as, but not limited to, topologies (such as intersections), streets, mountain ranges, roads, terrain, and the environment in general. In one example, a map can include a three-dimensional mesh generated using the decimation techniques discussed herein. In some instances, the map can be stored in a tiled format, such that individual tiles of the map represent a discrete portion of an environment, and can be loaded into working memory as needed. In some instances, the maps 628 can be divided into tiles by the vehicle computing device 604, by the computing device(s) 632, or by a combination of the two.

In some examples, the one or more maps 628 may be stored on a remote computing device(s) (such as the computing device(s) 632) accessible via network(s) 330. In some examples, multiple maps 628 may be stored based on, for example, a characteristic (e.g., type of entity, time of day, day of week, season of the year, etc.). Storing multiple maps 628 may have similar memory requirements, but increase the speed at which data in a heat map may be accessed.

In some instances, aspects of some or all of the components discussed herein may include any models, algorithms, and/or machine learning algorithms. For example, in some instances, the components in the memory 618 may be implemented as a neural network.

As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 6 (ID6), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet60, ResNet101, VGG, DenseNet, PointNet, and the like.

In at least one example, the sensor system(s) 606 can include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 606 can include multiple instances of each of these or other types of sensors. For instance, the LIDAR sensors can include individual LIDAR sensors located at the corners, front, back, sides, and/or top of the vehicle 602. As another example, the camera sensors can include multiple cameras disposed at various locations about the exterior and/or interior of the vehicle 602. The sensor system(s) 606 can provide input to the vehicle computing device 604. Additionally and/or alternatively, the sensor system(s) 606 can send sensor data, via the one or more networks 630, to the one or more computing device(s) at a particular frequency, after a lapse of a predetermined period of time, in near real-time, etc.

The vehicle 602 can also include one or more emitters 608 for emitting light and/or sound, as described above. The emitters 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 602 can also include one or more communication connection(s) 610 that enable communication between the vehicle 602 and one or more other local or remote computing device(s). For instance, the communication connection(s) 610 can facilitate communication with other local computing device(s) on the vehicle 602 and/or the drive module(s) 614. Also, the communication connection(s) 610 can allow the vehicle to communicate with other nearby computing device(s) (e.g., other nearby vehicles, traffic signals, etc.). The communications connection(s) 610 also enable the vehicle 602 to communicate with a remote teleoperations computing device or other remote services.

The communications connection(s) 610 can include physical and/or logical interfaces for connecting the vehicle computing device 604 to another computing device or a network, such as network(s) 630. For example, the communications connection(s) 610 can enable Wi-Fi-based communication such as via frequencies defined by the IEEE 802.11 standards, short range wireless frequencies such as Bluetooth®, cellular communication (e.g., 2G, 6G, 4G, 4G LTE, 5G, etc.) or any suitable wired or wireless communications protocol that enables the respective computing device to interface with the other computing device(s).

In at least one example, the vehicle 602 can include one or more drive modules 614. In some examples, the vehicle 602 can have a single drive module 614. In at least one example, if the vehicle 602 has multiple drive modules 614, individual drive modules 614 can be positioned on opposite ends of the vehicle 602 (e.g., the front and the rear, etc.). In at least one example, the drive module(s) 614 can include one or more sensor systems to detect conditions of the drive module(s) 614 and/or the surroundings of the vehicle 602. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders can be unique to the drive module(s) 614. In some cases, the sensor system(s) on the drive module(s) 614 can overlap or supplement corresponding systems of the vehicle 602 (e.g., sensor system(s) 606).

The drive module(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 614 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 614. Furthermore, the drive module(s) 614 also include one or more communication connection(s) that enable communication by the respective drive module with one or more other local or remote computing device(s).

In at least one example, the localization component 620, perception component 622, and/or the planning component 624 can process sensor data, as described above, and can send their respective outputs, over the one or more network(s) 630, to one or more computing device(s) 632. In at least one example, the localization component 620, the perception component 622, and/or the planning component 624 can send their respective outputs to the one or more computing device(s) 632 at a particular frequency, after a lapse of a predetermined period of time, in near real-time, etc.

As described above with reference to FIG. 1, and as discussed throughout this disclosure, the vehicle 602 can send sensor data to one or more computing device(s) 632, via the network(s) 630. In some examples, the vehicle 602 can send raw sensor data to the computing device(s) 632. In other examples, the vehicle 602 can send processed sensor data and/or representations of sensor data to the computing device(s) 632. In some examples, the vehicle 602 can send sensor data to the computing device(s) 632 at a particular frequency, after a lapse of a predetermined period of time, in near real-time, etc. In some cases, the vehicle 602 can send sensor data (raw or processed) to the computing device(s) 632 as one or more log files.

The computing device(s) 632 can receive the sensor data (raw or processed) and can generate and/or update maps based on the sensor data. Further, the computing device(s) 632 can decimate maps, evaluate decimated maps, and send one or more decimated maps to the vehicle 602. In at least one example, the computing device(s) 632 can include one or more processors 634 and memory 636 communicatively coupled with the one or more processors 634. In the illustrated example, the memory 636 of the computing device(s) 632 stores the map generation component 108, the semantic information component 110, the decimation component 112, the evaluation component 114, a log file component 638, a boundary component 640, a localization component 642, and a perception component 644. In at least one example, the computing device(s) 632 can correspond to the computing device(s) 106 of FIG. 1.

The map generation component 108 is described above in connection with FIG. 1. In general, the map generation component 108 can receive log files from one or more vehicles (such as the vehicle 602) and can generate or update a map of an environment. As discussed above, the map generation component 108 can generate a 3D mesh (or other representation, e.g., Signed Distance Function, voxel, voxel hash, parameterized surfaces, NURBS, etc.) of an environment based on sensor data captured by one or more LIDAR sensors (or other sensors), for example. In some instances, surfaces in a 3D map can be represented by one or more polygons. In some instances, objects can be represented by voxels, histograms, or distribution functions. In some instances, surfaces in a 3D map can be represented by a parameterized entity. In some instances, the map generation component 108 can associate semantic information with individual polygons of the 3D mesh. These and other operations of the map generation component 108 are discussed herein.

The semantic information component 110 is described above in connection with FIG. 1. In general, the semantic information component 110 can obtain sematic information associated with sensor data (e.g., points of a point cloud), polygons, objects, etc. and can associate the semantic information with various aspects of the 3D map. Such a semantic information component 110 may use classical and/or machine learning (e.g., neural network) algorithms to receive data and output one or more detections, segmentations, and/or classifications of objects associated with the data.

The decimation component 112 is described above in connection with FIG. 1. In general, the decimation component 112 can generate a decimated 3D mesh. In some instances, the decimation component 112 can generate a decimated 3D mesh based at least in part on semantic information, localization information (e.g., contribution of individual polygons towards localization operations), etc. In some instances, the decimation component 112 can select a particular decimation operator and/or decimation level based on aspects of the 3D mesh and/or objects represented in an environment. In some instances, the decimation component 112 can select a decimation operator and/or decimation level based at least in part on a machine learning algorithm trained to optimize the decimation of meshes.

The evaluation component 114 is described above in connection with FIG. 1. In general, the evaluation component 114 can receive candidate decimated meshes and evaluate the candidate meshes to select a decimated mesh based on a variety of factors (e.g., characteristics). By way of example, and without limitation, the evaluation component 114 can evaluate a decimated mesh based at least in part on a localization accuracy, localization speed, uncertainty in localization, tile file size, extensibility, seasonal robustness, and the like.

The log file component 638 can store log files including sensor data (raw or processed) received from one or more vehicles, such as vehicle 602. The sensor data in the log file component 638 can represent sensor data collected by one or more onboard sensor systems (e.g., such as onboard sensor system(s) 606), or other sensor system(s), at previous time(s) (e.g., previously connected sensor data). In some examples, the sensor data can be stored in association with locations, entity types, and/or other types of characteristics. Additionally, in at least one example, semantic information determined from the sensor data can be stored in the log file component 638. That is, the log file component 638 can also store semantic information associated with individual points of a point cloud or associated with individual polygons or elements.

In at least one example, the boundary component 640 can include functionality to determine one or more boundaries between objects, polygons, and/or elements of a map based at least in part on semantic information and/or localization contribution. For example, the boundary component 640 can receive semantic information regarding polygons and can determine if semantic information is the same between polygons. Upon determining a difference between polygons, the boundary component 640 can evaluate boundaries between adjacent polygons to determine if the boundary can be extended. If a boundary between polygons having different semantic information is above a threshold (e.g., length of boundary, number of polygons, etc.) the boundary component 640 can define a boundary as a boundary to be persisted (e.g., preserved or maintained) during a decimation operation. In some instances, the boundary component 640 can receive localization information indicating contributions of polygons to localizing a vehicle and can determine a boundary associated with one or more polygons having similar extents of localization contribution. That is, the boundary component 640 can define a boundary around regions with relatively more or less contributions to localizing a vehicle, such that decimations operators can be applied differently to the different regions.

In at least one example, the localization component 642 can include functionality to determine a location of a vehicle relative to a map based on sensor data captured of in environment. In the context of LIDAR data, the localization component 642 can utilize SLAM, CLAMS, etc., or can align a point cloud of LIDAR data with the various polygons comprised in a 3D mesh. In some example, the localization component 642 can receive sensor data from the log file component 638 and project or otherwise use the sensor data included in individual log files to localize a vehicle against various candidate decimated meshes. In at least one example, the localization component 642 can correspond to the localization component 620 operating on the vehicle 602.

In at least one example, the perception component 644 can include functionality to perform segmentation and/or classification on sensor data to determine attributes about objects, surfaces, elements, polygons, etc. in an environment. By way of example, the perception component 644 can analyze sensor data included in log files of the log file component 638 to detect, segment, and determine semantic information associated with objects represented in the sensor data (e.g. classify the object as belonging to one or more classes). In at least one example, the perception component 644 can correspond to the perception component 622 operating on the vehicle 602.

The processor(s) 616 of the vehicle 602 and the processor(s) 634 of the computing device(s) 632 can be any suitable processor capable of executing instructions to process data and perform operations as described herein. By way of example and not limitation, the processor(s) 616 and 634 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 618 and memory 636 are examples of non-transitory computer-readable media. Memory 618 and memory 636 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 6 is illustrated as a distributed system, in alternative examples, components of the vehicle 602 can be associated with the computing device(s) 632 and/or components of the computing device(s) 632 can be associated with the vehicle 602. That is, the vehicle 602 can perform one or more of the functions associated with the computing device(s) 632, and vice versa.

FIGS. 1-5 and 7-11 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 7:
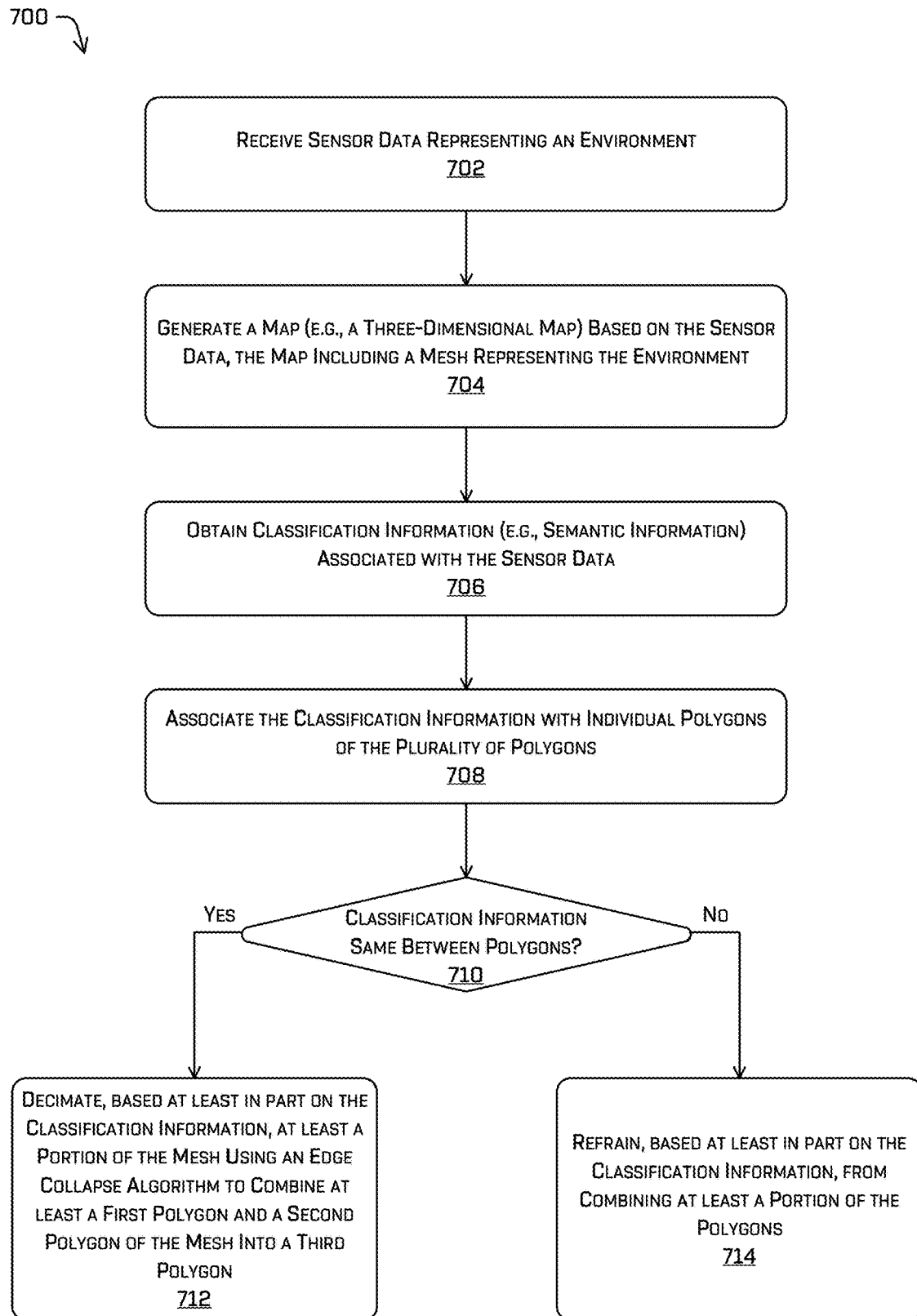
FIG. 7 depicts an example process for decimating a mesh based on classification information (e.g., semantic information), as discussed herein.

FIG. 7 depicts an example process 700 for decimating a mesh based on semantic information, as discussed herein. For example, some or all of the process 700 can be performed by one or more components in FIG. 6, as described herein. For example, some or all of the process 700 can be performed by one or more components of the computing device(s) 632.

At operation 702, the process can include receiving sensor data representing an environment. For example, the operation 702 can include receiving one or more log files (e.g., the log file(s) 104) from one or more vehicles. In some instances, plurality of log files can include the sensor data, which can represent data captured by one or more sensors, including but not limited to one or more LIDAR sensors, radar sensors, image sensors, sonar sensors, GPS sensors, IMU sensors, wheel encoders, humidity sensors, pressure sensors, magnetometers, accelerometers, and the like.

At operation 704, the process can include generating a three-dimensional map based on the sensor data, the three-dimensional map including a mesh representing an environment. In some instances, the mesh can include a plurality of polygons. In some instances, the polygons may include any regular or irregular shapes having any number of sides, such as triangles, rectangles, parallelograms, etc. In some instances, examples of techniques used to generate a mesh of an environment include, but are not limited to, marching cubes, marching tetrahedral, screened Poisson surface reconstruction, Delaunay triangulation, tangent plane estimation, alpha shape algorithm, Cocone algorithm, Power-Crust algorithm, ball pivoting algorithm, surface interpolated methods, and the like. As can be understood, the operation 704 can generate a 3D map including a mesh, wherein the mesh includes a plurality of polygons that define the shape of objects in the environment.

At operation 706, the process can include obtaining classification information (e.g., semantic information, geometry, distance, location, time, etc.) associated with the sensor data. In some instances, the operation 706 can include receiving the semantic information from the vehicle 602, and in some instances, the operation 706 can include generating the semantic information based on raw or processed sensor data at the computing device(s) 632. In some instances, the semantic information can include, but is not limited to, one or more of semantic classification, object identifier, map tile information, surface normal, data intensity (e.g., LIDAR data intensity), surface color, and the like.

At operation 708, the process can include associating the classification information with individual polygons of the plurality of polygons. In some instances, the operation 708 may include interpolating between polygons to assign semantic information to polygons lacking semantic information. In some instances, the operation 708 may include aligning image data including semantic information (e.g., segmentation and/or classification information) with the mesh and mapping the semantic information associated with the image data to individual polygons.

At operation 710, the process can include determining whether classification information is the same between polygons. In some instances, the operation 710 can include identifying a first polygon and a second polygon that is adjacent to the first polygon. Semantic information associated with each polygon can be compared. If the semantic information is the same (e.g., "yes" in the operation 710), the processing continues to operation 712 (e.g., both polygons are associated with a classification of a "building").

At operation 712, the process can include decimating, based at least in part on the classification information, at least a portion of the mesh using an edge collapse algorithm to combine at least a first polygon and a second polygon of the mesh into a third polygon. In some instances, any decimation operator can be used to combine polygons in the operation 712, as discussed herein. In some instances, the process 700 can be repeated until all polygons of the mesh have been decimated or until a particular decimation level is achieved. In some instances, the decimation level may be expressed as a fraction of the initial number of polygons (e.g., decimate to 70% of the initial number of polygons). In some instances, the decimation level may be expressed as a fixed amount (e.g., decimate a region so that the region is represented by N number of polygons, where N is an integer).

If the classification information is not the same between polygons (e.g., "no" in the operation 710), the process 700 turns to operation 714, whereby the process can include refraining, based at least in part on the classification information, from combining at least a portion of the polygons. In some instances, the operations can be repeated to check semantic information for all polygons adjacent to one of the target polygons, such that a portion of polygons are decimated or the processing moves onto other polygons for consideration.

Figure 8:
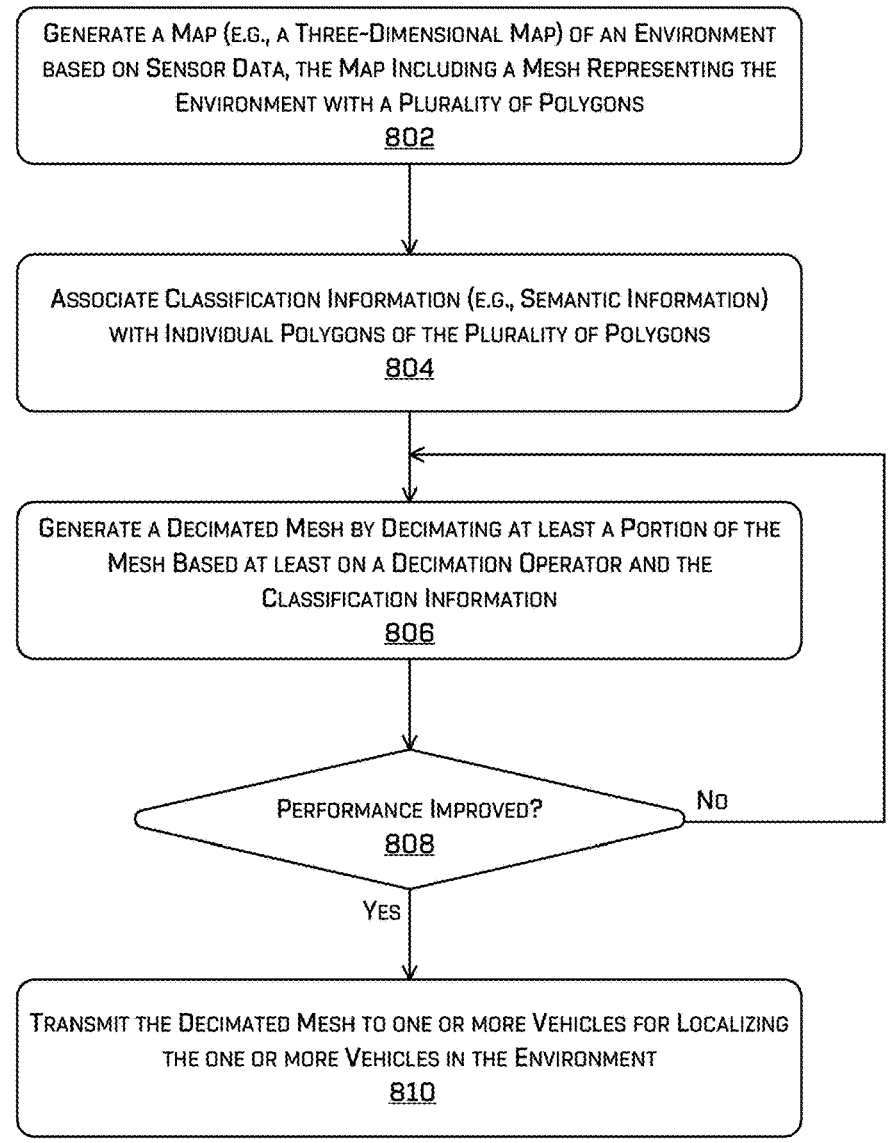
FIG. 8 depicts another example process for decimating a mesh based on classification information (e.g., semantic information), as discussed herein.

FIG. 8 depicts another example process 800 for decimating a mesh based on semantic information, as discussed herein. For example, some or all of the process 800 can be performed by one or more components in FIG. 6, as described herein. For example, some or all of the process 800 can be performed by one or more components of the computing device(s) 632.

At operation 802, the process can include generating a map (e.g., a three-dimensional map) of an environment based on sensor data, the map including a mesh representing the environment with a plurality of polygons. In some instances, the operation 802 can include accessing a map or receiving a map, in addition or instead of generating a map, as discussed above. In some instances, the three-dimensional map can be generated as discussed herein.

At operation 804, the process can include associating classification information (e.g., semantic information) with individual polygons of the plurality of polygons. In some instances, the operation 804 can include obtaining semantic information and mapping the semantic information to individual polygons. In some instances, the operation 802 can include using a segmenter and/or classifier to determine semantic classifications of objects.

At operation 806, the process can include generating a decimated mesh by decimating at least a portion of the mesh based at least in part on a decimation operator and the classification information. As discussed herein, the operation 806 can include selecting a decimation operator and/or a decimation level based on semantic information. In some instances, the operation 806 can include determining when semantic information is the same between polygons of the mesh and decimating when the polygons share at least a portion of the semantic information.

At operation 808, the process can include determining whether a performance of the decimated mesh is improved. For example, the operation 808 can include determining whether an accuracy associated with the decimated mesh is improved relative to other characteristics such as memory usage, processing time, and the like. In some instances, the operation 808 can include localizing one or more vehicles using the decimated mesh to determine an uncertainty or accuracy of localization using the decimated mesh. In some instances, the optimization may be based on other factors including, but not limited to, one or more of localization speed (e.g., processor speed/time), tile file size (e.g., a size of discrete portions of the mesh), extensibility, seasonable robustness, an uncertainty in localization, and the like. In some instances, different performance factors can be given different weights (e.g., localization accuracy may be weighted more or less than extensibility) when determining whether the decimated mesh is optimized. Based on the factors discussed herein, the operation can determine whether a performance of the decimated mesh is improved. If not (e.g., "no" in the operation 808), the processing may return to the operation 806 where other decimation operations and/or decimation operators are applied to a mesh to generate another candidate decimated mesh. If the performance is improved (e.g., "yes" in the operation 808), the process can continue to operation 810.

At operation 810, the process can include transmitting the decimated mesh to one or more vehicles for localizing the one or more vehicles in the environment. In some instances, the one or more vehicles can traverse an environment while collecting data, in which case the decimated mesh can be continuously updated based on log files captured by the one or more vehicles. That is, this process 800 (as well as the other processes discussed herein) can be performed iteratively to refine decimated meshes for accuracy and performance, as discussed herein.

Figure 9:
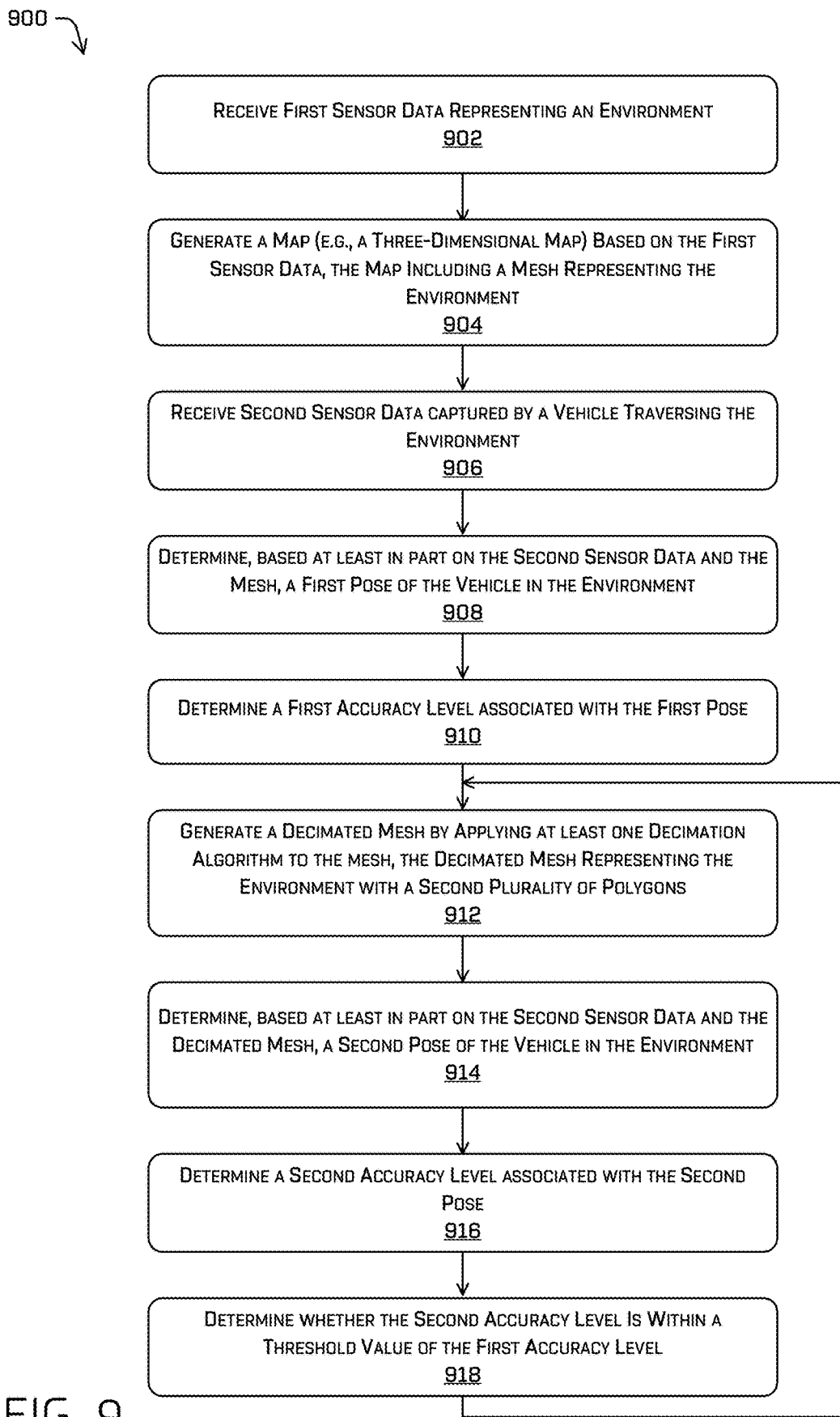
FIG. 9 depicts an example process for generating a decimated mesh and validating an accuracy of localizing a vehicle using the decimated mesh, as discussed herein.

FIG. 9 depicts an example process 900 for generating a decimated mesh and validating a localization of a vehicle using the decimated mesh, as discussed herein. For example, some or all of the process 900 can be performed by one or more components in FIG. 6, as described herein. For example, some or all of the process 900 can be performed by one or more components of the computing device(s) 632.

At operation 902, the process can include receiving first sensor data representing an environment. In some cases, the sensor data can be received within log files (e.g., as the log file(s) 104), as discussed herein.

At operation 904, the process can include generating a map (e.g., a three-dimensional map) based on the first sensor data, the map including a mesh representing the environment. In some instances, the operation 904 can include obtaining a 3D map as discussed herein.

At operation 906, the process can include receiving second sensor data captured by a vehicle traversing the environment. In some instances, the second sensor data can be received as a second plurality of log files that can be a subset of the first plurality of log files received in the operation 904.

At operation 908, the process can include determining, based on the second sensor data and the mesh, a first pose of the vehicle in the environment. In some instances, the operation 908 can include determining a confidence level and/or uncertainty with the orientation of the vehicle with respect to the mesh.

At operation 910, the operation can include determining a first accuracy level associated with the first pose. In some instances, the first accuracy level can be based in part on the confidence level and/or uncertainty associated with the localization. In some instances, the operation 910 can include obtaining a pose using a CLAMS algorithm, whereby the CLAMS-based pose can be considered to be a baseline or ground truth. In some instances, the first accuracy can be based on a difference between the first pose and a pose associated with the CLAMS algorithm. Of course, other sensor data and/or pose data can be used as a baseline or reference location for determining accuracy levels, as discussed herein.

At operation 912, the process can include generating a decimated mesh by applying at least one decimation algorithm to the mesh, the decimated mesh representing the environment with a second plurality of polygons. In some instances, the second plurality of polygons may be the same as, less than, or greater than the first plurality of polygons associated with the mesh.

At operation 914, the process can include determining, based on the second sensor data and the decimated mesh, a second pose (e.g., a location and/or orientation) of the vehicle in the environment. That is, the operation 914 can include localizing the vehicle in the environment using the decimated mesh.

At operation 916, the process can include determining a second accuracy level associated with the second pose. In some instances, the second accuracy can be based on a confidence level or uncertainty associated with the localization. In some instances, the second accuracy level can be based on a pose (e.g., a location and/or orientation) associated with a CLAMS-based pose, or other baseline or reference location and/or orientation.

At operation 918, the process can include determining whether the second accuracy level is within a threshold value of the first accuracy level. For example, the threshold value can represent a level of accuracy such that if the second accuracy level falls outside of the range of the first accuracy level, localizations based on such a decimated mesh may provide suboptimal location of the vehicle. On the other hand, if the second accuracy level is within the threshold value of the first accuracy level, the processing may return to the operation 912 to generate another decimated mesh based on another decimation operator and/or decimation level. Accordingly, some or all of the process 900 can repeat to converge on a decimated mesh that provides an acceptable accuracy level relative to a baseline accuracy level. Of course, a decimated mesh resulting from the process 900 can be provided to one or more vehicles at any time.

Figure 10:
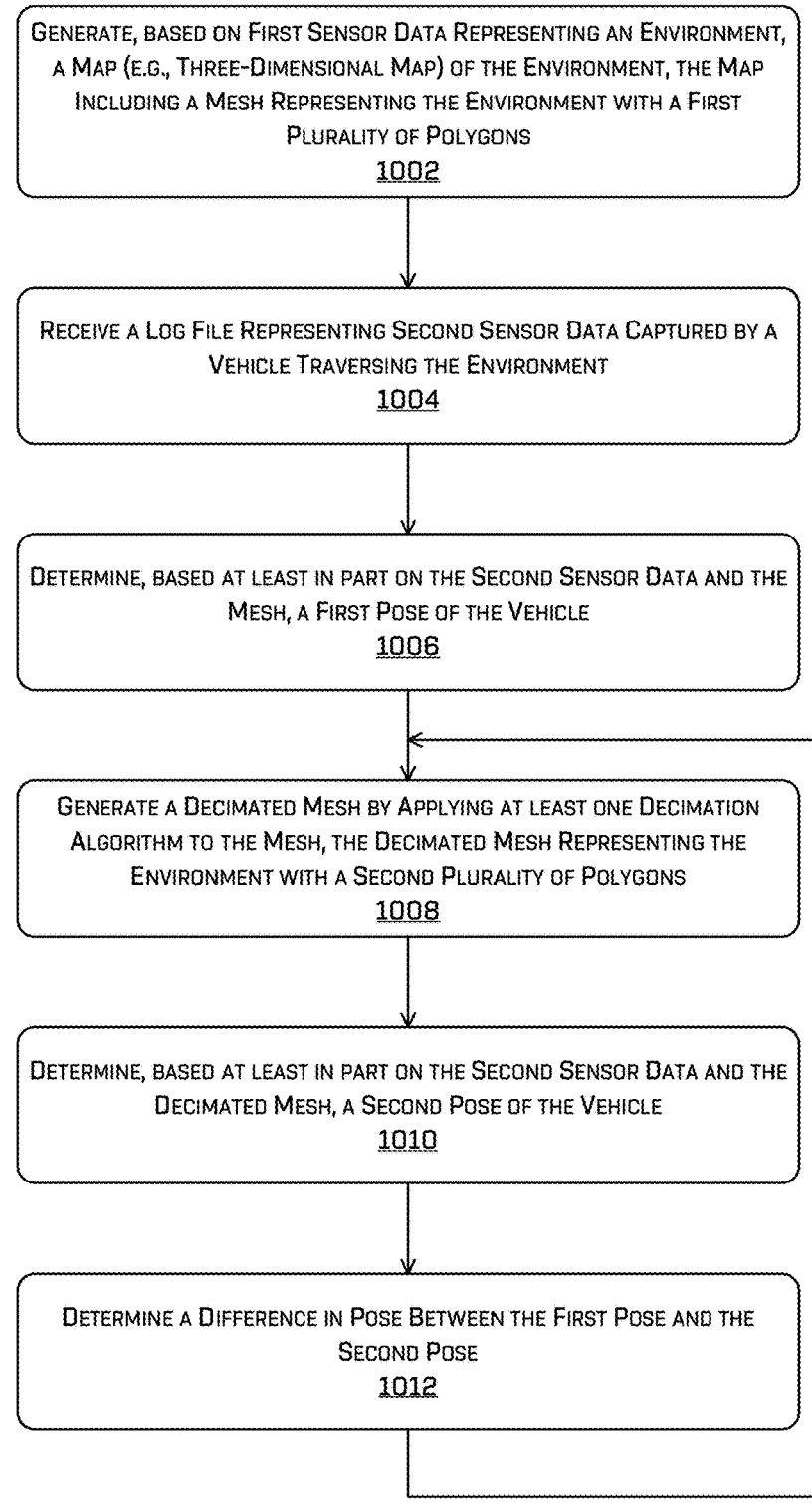
FIG. 10 depicts another example process for generating a decimated mesh and validating an accuracy of localizing a vehicle using the decimated mesh, as discussed herein.

FIG. 10 depicts another example process 1000 for generating a decimated mesh and validating an accuracy of localizing a vehicle using the decimated mesh, as discussed herein. For example, some or all of the process 1000 can be performed by one or more components in FIG. 6, as described herein. For example, some or all of the process 1000 can be performed by one or more components of the computing device(s) 632.

At operation 1002, the process can include generating, based on first sensor data representing an environment, a map (e.g., a three-dimensional map) of the environment, the map including a mesh representing the environment with a first plurality of polygons. In some instances, the sensor data can be obtained from one or more log files, as discussed herein. Further, in some instances, the map can be obtained as discussed herein.

At operation 1004, the process can include receiving a log file representing sensor data captured by a vehicle traversing the environment. In some cases, the plurality of log files can be received as the log file(s) 104, as discussed herein.

At operation 1006, the process can include determining, based on the second sensor data and the mesh, a first pose (e.g., location and/or orientation) of the vehicle. As discussed herein, the operation 1006 can include localizing the vehicle in the environment based on the mesh and based on sensor data captured by the vehicle representing the environment.

At operation 1008, the process can include generating a decimated mesh by applying at least one decimation algorithm to the mesh, the decimated mesh representing the environment with a second plurality of polygons. In some instances, the second plurality of polygons may be the same as less than, or greater than the first plurality of polygons, as discussed above. In some instances, decimated mesh can be generated using the at least one decimation algorithm, in accordance with the techniques discussed herein.

At operation 1010, the operation can include determining, based on the second sensor data and the decimated mesh, a second location and/or orientation of the vehicle. As discussed herein, the operation 1010 can include localizing the vehicle in the environment based on the decimated mesh and based on sensor data captured by the vehicle representing the environment.

At operation 1012, the process can include determining a difference in location and/or orientation between the first pose and the second pose. In some instances, the first location and/or orientation can be considered to be a baseline location (and/or orientation) or a reference location (and/or orientation). In some instances, the difference can indicate that localizing using the decimated mesh results in a different location and/or orientation of the vehicle on the map compared to localizing using the mesh. In some instances, the process 1000 can return to 1008 to generate a second decimated mesh to compare localization operations using the second decimated mesh against such localization operations using the mesh or the first decimated mesh. Of course, a decimated mesh resulting from the process 1000 can be provided to one or more vehicles at any time.

Figure 11:
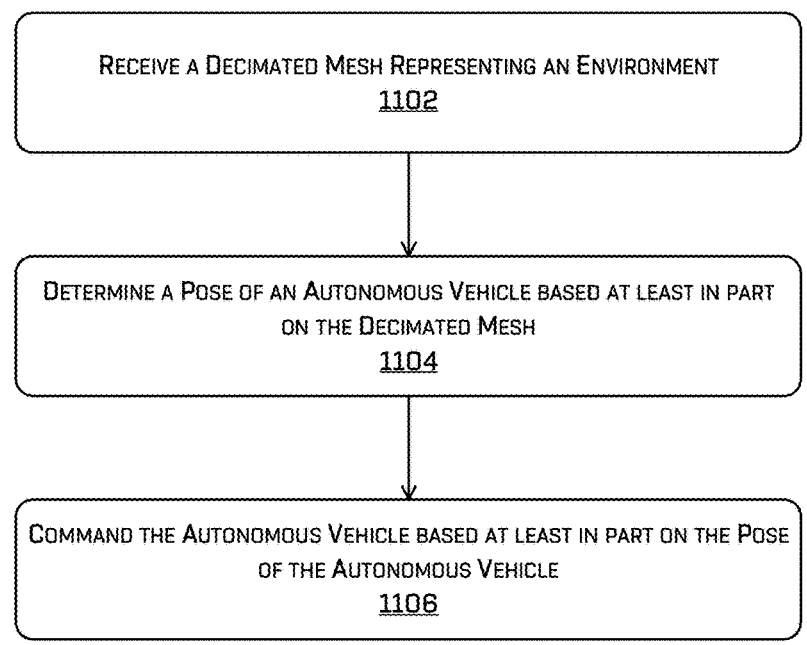
FIG. 11 depicts an example process for commanding an autonomous vehicle based at least in part on a location based on a decimated mesh, as discussed herein.

FIG. 11 depicts an example process 1100 for commanding an autonomous vehicle based at least in part on a location based on a decimated mesh, as discussed herein. For example, some or all of the process 1100 can be performed by one or more components in FIG. 6, as described herein. For example, some or all of the process 1100 can be performed by the one or more components of the vehicle 602.

At operation 1102, the process can include receiving a decimated mesh representing an environment. In some instances, the decimated mesh can be received by the vehicle 602 for incorporation into the database of maps stored in memory on the vehicle 602. In some instances, the decimated mesh received in the operation 1102 can be generated in accordance with the techniques discussed herein.

At operation 1104, the process can include determining a pose of an autonomous vehicle based at least in part on the decimated mesh. In some instances, the operation 1104 can include localizing the autonomous vehicle in the environment by projecting sensor data captured by the autonomous vehicle onto the decimated mesh.

At operation 1106, the process can include commanding the autonomous vehicle based at least in part on the pose of the autonomous vehicle. In some instances, the operation 1106 can include generating a route, trajectory, and/or control signals to one or more systems of the autonomous vehicle to navigate the autonomous vehicle within the environment.

EXAMPLE CLAUSES

A. A system comprising: one or more processors; and one or more computer-readable media storing instructions executable by the one or more processors, wherein the instructions program the system to: receive sensor data representing an environment surrounding an autonomous vehicle, the sensor data including LIDAR data representing the environment; generate, based at least in part on the sensor data, a three-dimensional map of the environment, the three-dimensional map including at least a mesh representing the environment with a plurality of polygons; obtain classification information associated with the sensor data; associate the classification information with a polygon of the plurality of polygons; and decimate at least a portion of the mesh to combine at least a portion of a first polygon and at least a portion of a second polygon into a third polygon, wherein the first polygon and the second polygon are associated with a same classification information.

B: The system of paragraph A, wherein the instructions, when executed by the one or more processors, further program the system to: identify a fourth polygon associated with first classification information; identify a fifth polygon adjacent to the fourth polygon, the fifth polygon associated with second classification information that is different than the first classification information; and maintain, based at least in part on the first classification information being different than the second classification information, a number of vertices associated with the fourth polygon and the fifth polygon or an edge between the fourth polygon and the fifth polygon.

C: The system of paragraph A or B, wherein the instructions, when executed by the one or more processors, further program the system to: identify a boundary between a first subset of polygons associated with a first classification information and a second subset of polygons associated with a second classification information; and decimate the first subset of polygons independent of the second subset of polygons while maintaining the boundary between the first subset of polygons and the second subset of polygons.

D: The system of any of paragraphs A-C, wherein the instructions, when executed by the one or more processors, further program the system to: identify a first subset of polygons associated with a first classification information; identify a second subset of polygons associated with a second classification information; select, based at least in part on the first classification information, a first decimation algorithm for decimating the first subset of polygons; select, based at least in part on the second classification information, a second decimation algorithm for decimating the second subset of polygons; decimate the first subset of polygons using the first decimation algorithm; and decimate the second subset of polygons using the second decimation algorithm; wherein the first decimation algorithm is different than the second decimation algorithm.

E: The system of any of paragraphs A-D, wherein the instructions, when executed by the one or more processors, further program the system to: generate a decimated mesh using at least an edge collapse algorithm, wherein the decimated mesh represents the environment; and send at least a portion of the decimated mesh to the autonomous vehicle for localizing and controlling the autonomous vehicle in the environment.

F: A method comprising: generating, based at least in part on sensor data representing an environment, a map of an environment, the map including a mesh representing the environment with a plurality of polygons; associating classification information with a polygon of the plurality of polygons; and generating, based at least in part on a decimation operator and the classification information, a decimated mesh by decimating at least a portion of the mesh.

G: The method of paragraph F, further comprising: selecting a subset of the plurality of polygons representing an object in the environment, the subset associated with a semantic classification; selecting a decimation operator based at least in part on the semantic classification; and decimating at least a portion of the subset using the decimation operator.

H: The method of paragraph F or G, wherein the decimation operator includes at least one of a vertex removal operator, an edge collapse operator, a quadratic edge collapse operator, or a half-edge collapse operator.

I: The method of any of paragraphs F-H, wherein the classification information includes one or more semantic classifications of objects represented in the sensor data, the semantic classifications including one or more of a building, a curb, a road, a tree, or foliage.

J: The method of any of paragraphs F-I, further comprising: identifying a first subset of polygons of the mesh adjacent to a second subset of polygons of the mesh, wherein the first subset of polygons is associated with a first classification information and wherein the second subset of polygons is associated with a second classification information different than the first classification information; and decimating a first portion of the first subset of polygons using a first decimation operator and decimating a second portion of the second subset of polygons using a second decimation operator while maintaining a number of vertices and a number of edges along a boundary between the first subset of polygons and the second subset of polygons.

K: The method of any of paragraphs F-J, further comprising: determining a boundary between a first subset of the plurality of polygons and a second subset of the plurality of polygons; and decimating at least a portion of the first subset and at least a portion of the second subset while maintaining the boundary between the first subset and the second subset.

L: The method of any of paragraphs F-K, further comprising: identifying a first subset of the plurality of polygons associated with a first classification information; identifying a second subset of the plurality of polygons associated with a second classification information; selecting a first decimation algorithm for decimating a portion of the first subset, the first decimation algorithm associated with a first decimation level; selecting a second decimation algorithm for decimating a portion of the second subset, the second decimation algorithm associated with a second decimation level; decimating the portion of the first subset using the first decimation algorithm; and decimating the portion of the second subset using the second decimation algorithm.

M: The method of any of paragraphs F-L, further comprising: receiving the sensor data captured by a vehicle traversing the environment; determining, for a subset of polygons of the plurality of polygons, a contribution of the subset of polygons to localizing the vehicles for traversing the environment; and decimating a portion of the mesh based at least in part on the contribution of the subset of the polygons.

N: The method of any of paragraphs F-M, wherein the sensor data further includes at least one of LIDAR data, camera data, radar data, or sonar data.

O: The method of any of paragraphs F-N, further comprising: dividing the decimated mesh into a plurality of tiles representing a discrete portion of the environment; and sending at least a portion of the plurality of tiles to an autonomous vehicle for localizing the autonomous vehicle in the environment.

P: One or more non-transitory computer-readable medium storing instructions that, when executed, cause one or more processors to perform operations comprising: generating, based at least in part on sensor data representing an environment, a three-dimensional map of the environment; associating semantic information with elements of the three-dimensional map; and generating, based at least in part on a decimation operator and the semantic information, a decimated three-dimensional map by decimating at least a portion of the elements.

Q: The one or more non-transitory computer-readable medium of paragraph P, the operations further comprising: selecting a subset of the elements representing an object in the environment, the subset associated with a semantic classification; selecting a decimation operator based at least in part on the semantic classification; and decimating at least a portion of the elements using the decimation operator.

R: The one or more non-transitory computer-readable medium of paragraph P or Q, the operations further comprising: identifying a first subset of elements of the three-dimensional map adjacent to a second subset of elements, wherein the first subset of elements is associated with a first semantic classification and wherein the second subset of elements is associated with a second semantic classification different than the first semantic classification; determining a boundary between the first subset of elements and the second subset of elements, the boundary comprising one or more edges and one or more vertices; and decimating at least a portion of the first subset of elements using a first decimation operator and decimate at least a portion of the second subset of elements using a second decimation operator to create the decimated three-dimensional map, wherein the decimation operator maintains the boundary.

S: The one or more non-transitory computer-readable medium of any of paragraphs P-R, the operations further comprising: determining, based at least in part on the decimated three-dimensional map, a signal representative of a trajectory for an autonomous vehicle to traverse through the environment; and transmitting the signal to the autonomous vehicle, the signal causing the autonomous vehicle to traverse the environment.

T: The one or more non-transitory computer-readable medium of any of paragraphs P-S, the operations further comprising: identifying a first subset of the elements associated with a first semantic classification; identifying a second subset of the elements associated with a second semantic classification; selecting a first decimation algorithm for decimating at least a portion of the first subset, the first decimation algorithm associated with a first decimation level; selecting a second decimation algorithm for decimating at least a portion of the second subset, the second decimation algorithm associated with a second decimation level; decimating the at least the portion of the first subset using the first decimation algorithm; and decimating the at least the portion of the second subset using the second decimation algorithm.

AA. A system comprising: one or more processors; and one or more computer-readable media storing instructions executable by the one or more processors, wherein the instructions program the system to: receive first sensor data including at least LIDAR data representing an environment; generate, based at least in part on the first sensor data, a three-dimensional map of the environment, the three-dimensional map including at least a mesh representing the environment with a first plurality of polygons; receive second sensor data captured by sensors disposed on a vehicle traversing the environment; determine, based at least in part on the second sensor data and the mesh, a first pose of the vehicle in the environment; determine a first accuracy level associated with the mesh; generate a decimated mesh by applying at least one decimation algorithm to the mesh, the decimated mesh representing the environment with a second plurality of polygons; determine, based at least in part on projecting the second sensor data onto the decimated mesh, a second pose of the vehicle in the environment; determine a second accuracy level associated with the decimated mesh; determine that the second accuracy level is within a threshold value of the first accuracy level; and send at least a portion of the decimated mesh to an autonomous vehicle for controlling the autonomous vehicle to navigate within the environment.

BB: The system of paragraph AA, wherein the decimated mesh is a first decimated mesh, wherein the at least one decimation algorithm is a first decimation algorithm, and wherein the instructions, when executed by the one or more processors, further program the system to: generate a second decimated mesh by applying a second decimation algorithm to the mesh, the second decimated mesh representing the environment with a third plurality of polygons, wherein the third plurality of polygons is less than the second plurality of polygons; determine, based at least in part on the second sensor data and the second decimated mesh, a third pose of the vehicle in the environment; determine a third accuracy level associated with the second decimated mesh; and determine that the third accuracy level is outside the threshold value of the first accuracy level.

CC: The system of paragraph BB, wherein: the first decimation algorithm is associated with a first decimation level; and the second decimation algorithm is associated with a second decimation level.

DD: The system of any of paragraphs AA-CC, wherein: a number of the first plurality of polygons is different than a number of the second plurality of polygons, or an arrangement of the first plurality of polygons is different than an arrangement of the second plurality of polygons.

EE: The system of any of paragraphs AA-DD, wherein the instructions, when executed by the one or more processors, further program the system to: receive a third sensor data captured by a plurality of vehicles traversing the environment; determine, for a subset of polygons of the first plurality of polygons, a contribution of the subset of polygons to localizing the plurality of vehicles traversing the environment; determine that the contribution is below a threshold value; select a decimation algorithm for decimating the subset of polygons; and decimate the subset of polygons using the decimation algorithm.

FF: A method comprising: generating, based at least in part on first sensor data representing an environment, a map of the environment, the map including a mesh representing the environment with a first plurality of polygons; receiving second sensor data captured by a vehicle traversing the environment; determining a first pose of the vehicle in the environment, the first pose associated with a first characteristic; generating a decimated mesh by applying a decimation algorithm to the mesh, the decimated mesh representing the environment with a second plurality of polygons; determining, based at least in part on the second sensor data and the decimated mesh, a second pose of the vehicle in the environment, the second pose associated with a second characteristic; and determining a difference between the first characteristic and the second characteristic.

GG: The method of paragraph FF, wherein: the first characteristic includes one or more of a first file size, a first uncertainty, or a first processing time, and the second characteristic includes one or more of a second file size, a second uncertainty, or a second processing time.

HH: The method of paragraph FF or GG, further comprising: sending at least a portion of the decimated mesh to an autonomous vehicle for controlling the autonomous vehicle to navigate within the environment.

II: The method of any of paragraphs FF-HH, wherein the decimated mesh is a first decimated mesh, wherein the decimation algorithm is a first decimation algorithm, and wherein the difference is a first difference, the method further comprising: generating a second decimated mesh by applying a second decimation algorithm to the mesh, the second decimated mesh representing the environment with a third plurality of polygons; determining, based at least in part on the second sensor data and the second decimated mesh, a third pose of the vehicle in the environment, the third pose associated with a third characteristic; and determining a second difference between the first characteristic and the third characteristic.

JJ: The method of paragraph II, wherein the first decimation algorithm and the second decimation algorithm are associated with a same decimation operator, wherein the first decimation algorithm is associated with a first decimation level, and wherein the second decimation algorithm is associated with a second decimation level less than the first decimation level; or wherein the first decimation algorithm is associated with a first decimation operator and wherein the second decimation algorithm is associated with a second decimation operator different than the first decimation operator.

KK: The method of any of paragraphs FF-JJ, further comprising: receiving semantic information associated with the first sensor data; associating the semantic information with individual polygons of the first plurality of polygons; and generating the decimated mesh based at least in part on the semantic information.

LL: The method of paragraph KK, wherein generating the decimated mesh includes: determining a boundary between a first subset of the first plurality of polygons associated with a first semantic classification and a second subset of the first plurality of polygons associated with a second semantic classification, the boundary comprising a number of shared edges or a number of shared vertices; and decimating at least a portion of the first subset and at least a portion of the second subset while maintaining the boundary between the first subset and the second subset.

MM: The method of any of paragraphs FF-LL, further comprising: identifying data representing a dynamic object or a potentially dynamic object in the first sensor data; and omitting the data representing the dynamic object or the potentially dynamic object from the map representing the environment.

NN: The method of any of paragraphs FF-MM, further comprising: receiving a plurality of log files including third sensor data captured by a plurality of vehicles traversing the environment; determining, for a subset of polygons of the first plurality of polygons, a contribution of the subset of polygons to localizing a vehicle of the plurality of vehicles traversing the environment; determining that the contribution is below a threshold value; selecting the decimation algorithm for decimating the subset of polygons; and generating the decimated mesh by decimating the subset of polygons using the decimation algorithm to represent a portion of the environment represented by the subset of polygons with fewer polygons.

OO: The method of paragraph NN, wherein the subset of polygons is a first subset of polygons and wherein the contribution is a first contribution, the method further comprising: determining that a second contribution of a second subset of polygons to localizing the vehicle traversing the environment meets or exceeds the threshold value; and maintaining, based at least in part on the second contribution of the second subset of polygons meeting or exceeding the threshold value, a number of polygons of the second subset of polygons.

PP: A non-transitory computer-readable medium storing instructions that, when executed, cause one or more processors to perform operations comprising: generating, based at least in part on first sensor data representing an environment, a map of the environment, the map including at least a mesh representing the environment with a first plurality of polygons; receiving second sensor data captured by sensors disposed on a vehicle traversing the environment; determining a first pose of the vehicle in the environment, the first pose associated with a first characteristic; generating a decimated mesh by applying a decimation algorithm to the mesh, the decimated mesh representing the environment with a second plurality of polygons; determining, based at least in part on the second sensor data and the decimated mesh, a second pose of the vehicle in the environment, the second pose associated with a second characteristic; determining a difference between the first characteristic and the second characteristic; and sending, based at least in part on the difference, at least a portion of the decimated mesh to an autonomous vehicle for controlling the autonomous vehicle to navigate within the environment.

QQ: The non-transitory computer-readable medium of paragraph PP, wherein: the first characteristic includes one or more of a first file size, a first uncertainty, or a first processing time, and the second characteristic includes one or more of a second file size, a second uncertainty, or a second processing time.

RR: The non-transitory computer-readable medium of paragraph PP or QQ, the operations further comprising: receiving a plurality of log files including third sensor data captured by sensors disposed about a vehicle traversing the environment; and determining, for a subset of polygons of the first plurality of polygons, a contribution of the subset of polygons to localizing the vehicle traversing the environment; wherein the contribution is based at least in part on one or more characteristics associated with localizing the vehicle with the subset of polygons.

SS: The non-transitory computer-readable medium of any of paragraphs PP-RR, the operations further comprising: receiving semantic information associated with the first sensor data; associating the semantic information with individual polygons of the first plurality of polygons; and generating the decimated mesh based at least in part on the semantic information.

TT: The non-transitory computer-readable medium of paragraph SS, wherein generating the decimated mesh includes: determining a boundary between a first subset of the first plurality of polygons associated with a first semantic classification and a second subset of the first plurality of polygons associated with a second semantic classification, the boundary associated with a number of edges and a number of vertices; and decimating at least a portion of the first subset and at least a portion of the second subset while maintaining the boundary.

While the example clauses described above are described with respect to one particular implementation, it should be understood that, in the context of this document, the content of the example clauses can also be implemented via a method, device, system, and/or computer-readable medium.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer-readable media storing instructions executable by the one or more processors, wherein the instructions program the system to:
receive first sensor data including at least LIDAR data representing an environment;
generate, based at least in part on the first sensor data, a three-dimensional map of the environment, the three-dimensional map including at least a mesh representing the environment with a first plurality of polygons;
receive second sensor data captured by sensors disposed on a vehicle traversing the environment;
determine, based at least in part on the second sensor data and the mesh, a first pose of the vehicle in the environment;
determine, based at least in part on the first pose, a first accuracy level associated with the mesh;
generate a decimated mesh by applying at least one decimation algorithm to the mesh, the decimated mesh representing the environment with a second plurality of polygons;
determine, based at least in part on the second sensor data and the decimated mesh, a second pose of the vehicle in the environment;
determine, based at least in part on the second pose, a second accuracy level associated with the decimated mesh;
determine that the second accuracy level is within a threshold value of the first accuracy level; and
send at least a portion of the decimated mesh to an autonomous vehicle for controlling the autonomous vehicle to navigate within the environment.

2. The system of claim 1, wherein the decimated mesh is a first decimated mesh, wherein the at least one decimation algorithm is a first decimation algorithm, and wherein the instructions, when executed by the one or more processors, further program the system to:
generate a second decimated mesh by applying a second decimation algorithm to the mesh, the second decimated mesh representing the environment with a third plurality of polygons, wherein the third plurality of polygons is less than the second plurality of polygons;
determine, based at least in part on the second sensor data and the second decimated mesh, a third pose of the vehicle in the environment;
determine a third accuracy level associated with the second decimated mesh; and
determine that the third accuracy level is outside the threshold value of the first accuracy level.

3. The system of claim 2, wherein:
the first decimation algorithm is associated with a first decimation level; and
the second decimation algorithm is associated with a second decimation level.

4. The system of claim 1, wherein:
a number of the first plurality of polygons is different than a number of the second plurality of polygons, or
an arrangement of the first plurality of polygons is different than an arrangement of the second plurality of polygons.

5. The system of claim 1, wherein the instructions, when executed by the one or more processors, further program the system to:
receive third sensor data captured by a plurality of vehicles traversing the environment;
determine, for a subset of polygons of the first plurality of polygons, a contribution of the subset of polygons to localizing the plurality of vehicles traversing the environment;
determine that the contribution is below a threshold value; and
decimate the subset of polygons using the at least one decimation algorithm.

6. A method comprising:
generating, based at least in part on first sensor data representing an environment, a map of the environment, the map including a mesh representing the environment with a first plurality of polygons;
receiving second sensor data captured by a vehicle traversing the environment;
determining, based at least in part on a localization component, a first pose of the vehicle in the environment, the first pose associated with a first characteristic;
generating a decimated mesh by applying a decimation algorithm to the mesh, the decimated mesh representing the environment with a second plurality of polygons;
determining, based at least in part on the second sensor data, the localization component, and the decimated mesh, a second pose of the vehicle in the environment, the second pose associated with a second characteristic; and
determining a difference between the first characteristic and the second characteristic.

7. The method of claim 6, wherein:
the first characteristic includes one or more of a first file size, a first uncertainty, or a first processing time, and
the second characteristic includes one or more of a second file size, a second uncertainty, or a second processing time.

8. The method of claim 6, further comprising:
sending at least a portion of the decimated mesh to an autonomous vehicle for controlling the autonomous vehicle to navigate within the environment.

9. The method of claim 6, wherein the decimated mesh is a first decimated mesh, wherein the decimation algorithm is a first decimation algorithm, and wherein the difference is a first difference, the method further comprising:
generating a second decimated mesh by applying a second decimation algorithm to the mesh, the second decimated mesh representing the environment with a third plurality of polygons;
determining, based at least in part on the second sensor data and the second decimated mesh, a third pose of the vehicle in the environment, the third pose associated with a third characteristic; and
determining a second difference between the first characteristic and the third characteristic.

10. The method of claim 9,
wherein the first decimation algorithm and the second decimation algorithm are associated with a same decimation operator, wherein the first decimation algorithm is associated with a first decimation level, and wherein the second decimation algorithm is associated with a second decimation level less than the first decimation level; or
wherein the first decimation algorithm is associated with a first decimation operator and wherein the second decimation algorithm is associated with a second decimation operator different than the first decimation operator.

11. The method of claim 6, further comprising:
receiving semantic information associated with the first sensor data;
associating the semantic information with individual polygons of the first plurality of polygons; and
generating the decimated mesh based at least in part on the semantic information.

12. The method of claim 11, wherein generating the decimated mesh includes:
determining a boundary between a first subset of the first plurality of polygons associated with a first semantic classification and a second subset of the first plurality of polygons associated with a second semantic classification, the boundary comprising a number of shared edges or a number of shared vertices; and
decimating at least a portion of the first subset and at least a portion of the second subset while maintaining the boundary between the first subset and the second subset.

13. The method of claim 6, further comprising:
identifying data representing a dynamic object or a potentially dynamic object in the first sensor data; and
omitting the data representing the dynamic object or the potentially dynamic object from the map representing the environment.

14. The method of claim 6, wherein the vehicle is a first vehicle, the method further comprising:
receiving a plurality of log files including third sensor data captured by a plurality of vehicles traversing the environment;
determining, for a subset of polygons of the first plurality of polygons, a contribution of the subset of polygons to localizing a second vehicle of the plurality of vehicles traversing the environment;
determining that the contribution is below a threshold value;
selecting the decimation algorithm for decimating the subset of polygons; and
generating the decimated mesh by decimating the subset of polygons using the decimation algorithm to represent a portion of the environment represented by the subset of polygons with fewer polygons.

15. The method of claim 14, wherein the subset of polygons is a first subset of polygons and wherein the contribution is a first contribution, the method further comprising:
determining that a second contribution of a second subset of polygons to localizing the second vehicle traversing the environment meets or exceeds the threshold value; and
maintaining, based at least in part on the second contribution of the second subset of polygons meeting or exceeding the threshold value, a number of polygons of the second subset of polygons.

16. A non-transitory computer-readable medium storing instructions that, when executed, cause one or more processors to perform operations comprising:
generating, based at least in part on first sensor data representing an environment, a map of the environment, the map including at least a mesh representing the environment with a first plurality of polygons;
receiving second sensor data captured by a sensor disposed on a vehicle traversing the environment;
determining, based at least in part on a localization component, a first pose of the vehicle in the environment, the first pose associated with a first characteristic;
generating a decimated mesh by applying a decimation algorithm to the mesh, the decimated mesh representing the environment with a second plurality of polygons;
determining, based at least in part on the second sensor data, the localization component, and the decimated mesh, a second pose of the vehicle in the environment, the second pose associated with a second characteristic;
determining a difference between the first characteristic and the second characteristic; and
sending, based at least in part on the difference, at least a portion of the decimated mesh to an autonomous vehicle for controlling the autonomous vehicle to navigate within the environment.

17. The non-transitory computer-readable medium of claim 16, wherein:
the first characteristic includes one or more of a first file size, a first uncertainty, or a first processing time, and
the second characteristic includes one or more of a second file size, a second uncertainty, or a second processing time.

18. The non-transitory computer-readable medium of claim 16, the operations further comprising:
determining, for a subset of polygons of the first plurality of polygons, a contribution of the subset of polygons to localizing the vehicle traversing the environment;
wherein the contribution is based at least in part on one or more characteristics associated with localizing the vehicle with the subset of polygons.

19. The non-transitory computer-readable medium of claim 16, the operations further comprising:

receiving semantic information associated with the first sensor data;

associating the semantic information with individual polygons of the first plurality of polygons; and generating the decimated mesh based at least in part on the semantic information.

20. The non-transitory computer-readable medium of claim 19, wherein generating the decimated mesh includes:

determining a boundary between a first subset of the first plurality of polygons associated with a first semantic classification and a second subset of the first plurality of polygons associated with a second semantic classification, the boundary associated with a number of edges and a number of vertices; and decimating at least a portion of the first subset and at least a portion of the second subset while maintaining the boundary.

\* \* \* \* \*